US 12,246,607 B2

(12) United States Patent
Demont et al.

(10) Patent No.: US 12,246,607 B2
(45) Date of Patent: Mar. 11, 2025

(54) ELECTRIC POWER SUPPLY SYSTEM FOR VEHICLE

(71) Applicant: H55 SA, Sion (CH)

(72) Inventors: Sébastien Demont, Les Agettes (CH); Stéphane Pierre-Jean Boirin, Montreux (CH); David Costes, Sion (CH)

(73) Assignee: H55 SA, Sion (CH)

( * ) Notice: Subject to any disclaimer, the term of this patent is extended or adjusted under 35 U.S.C. 154(b) by 160 days.

(21) Appl. No.: 18/194,331

(22) Filed: Mar. 31, 2023

(65) Prior Publication Data

US 2023/0249563 A1    Aug. 10, 2023

Related U.S. Application Data

(63) Continuation-in-part of application No. PCT/IB2022/060860, filed on Nov. 10, 2022.

(Continued)

(30) Foreign Application Priority Data

Nov. 16, 2021    (CH) .............................. 20210070569

(51) Int. Cl.
*H02J 7/14*    (2006.01)
*B60L 15/04*    (2006.01)
(Continued)

(52) U.S. Cl.
CPC .............. *B60L 53/20* (2019.02); *B60L 15/04* (2013.01); *B60L 50/60* (2019.02); *B60L 58/18* (2019.02);
(Continued)

(58) Field of Classification Search
CPC .......... B60L 53/20; B60L 50/60; B60L 58/18; B60L 15/04; H02J 7/00; H02K 11/33; H02K 11/40; B64D 31/00
See application file for complete search history.

(56) References Cited

U.S. PATENT DOCUMENTS

| 10,131,246 B2 | 11/2018 | Demont |
| 10,322,824 B1 | 6/2019 | Demont et al. |

(Continued)

FOREIGN PATENT DOCUMENTS

| EP | 2631921 | 8/2013 |
| FR | 3072653 | 4/2019 |
| FR | 3105299 | 6/2021 |

OTHER PUBLICATIONS

International Search Report and Written Opinion for International Application No. PCT/IB2022/060860, mailed Feb. 21, 2023, in 10 pages.

*Primary Examiner* — Jared Fureman
*Assistant Examiner* — Esayas G Yeshaw
(74) *Attorney, Agent, or Firm* — Knobbe, Martens, Olson & Bear, LLP

(57) ABSTRACT

A power supply system can include an electrical power source and a power converter connectable to a load. The electrical power source can provide a first DC voltage with a first potential difference ($V_H$) between a first DC potential output and a second DC potential output, and a third DC potential output having a potential between the potential at the first DC potential output and the potential at the second DC potential output. The power converter can provide a second voltage with a second potential difference ($V_L$) between a first potential output (V+) and a second potential output (V−). The second potential difference ($V_L$) can be less than the first potential difference ($V_H$). The power converter can electrically isolate the first DC voltage from the second (Continued)

voltage, and the second potential output (V−) can be connected to the third DC potential output using a first connection including an impedance.

30 Claims, 18 Drawing Sheets

Related U.S. Application Data

(60) Provisional application No. 63/301,967, filed on Jan. 21, 2022.

(51) Int. Cl.
| | |
|---|---|
| *B60L 50/60* | (2019.01) |
| *B60L 53/20* | (2019.01) |
| *B60L 58/18* | (2019.01) |
| *B64D 27/24* | (2006.01) |
| *B64D 31/00* | (2006.01) |
| *H02J 7/00* | (2006.01) |
| *H02K 11/33* | (2016.01) |
| *H02K 11/40* | (2016.01) |

(52) U.S. Cl.
CPC ............. *B64D 27/24* (2013.01); *B64D 31/00* (2013.01); *H02J 7/0013* (2013.01); *H02J 7/0063* (2013.01); *H02K 11/33* (2016.01); *H02K 11/40* (2016.01); *B60L 2200/10* (2013.01); *B60L 2210/10* (2013.01); *B60L 2240/547* (2013.01); *B64D 2221/00* (2013.01); *H02J 2207/20* (2020.01)

(56) References Cited

U.S. PATENT DOCUMENTS

| | | |
|---|---|---|
| 10,479,223 B2 | 11/2019 | Demont |
| 10,576,843 B2 | 3/2020 | Demont et al. |
| 10,854,866 B2 | 12/2020 | Demont et al. |
| 11,059,386 B2 | 7/2021 | Demont et al. |
| 11,063,323 B2 | 7/2021 | Demont et al. |
| 11,065,979 B1 | 7/2021 | Demont |
| 11,148,819 B2 | 10/2021 | Demont et al. |
| 11,407,311 B2 * | 8/2022 | Erhart .................. H02J 7/0013 |
| 11,456,511 B2 | 9/2022 | Demont et al. |
| 2008/0191677 A1 * | 8/2008 | Bacchi .................. H02M 3/156 |
| | | 323/282 |
| 2013/0307324 A1 | 11/2013 | Johannsen et al. |
| 2014/0210352 A1 * | 7/2014 | Grajcar ............. H05B 45/3725 |
| | | 315/122 |
| 2016/0134210 A1 * | 5/2016 | Bock .................... H01H 50/323 |
| | | 335/202 |
| 2020/0231047 A1 | 7/2020 | Demont |
| 2021/0147092 A1 | 5/2021 | Brown et al. |

* cited by examiner

ELECTRIC POWER SUPPLY SYSTEM FOR VEHICLE

RELATED APPLICATIONS

Any and all applications for which a domestic or foreign priority claim is identified in the Application Data Sheet of the present application are hereby incorporated by reference under 37 CFR 1.57.

FIELD

The present disclosure is related to an electrical power supply system for an electrically driven vehicle, such as an aircraft, as well as an electrical supply network and a method for testing an insulation integrity of the electrical supply network.

DESCRIPTION OF RELATED ART

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

As an example, the FAA advisory circular AC 25.1309-1 describes acceptable means for showing compliance with the airworthiness requirements of US Federal Aviation Regulations and defines different levels of failure conditions according to their severity:

Failure Conditions with No Safety Effect.
Minor Failure Conditions.
Major Failure Conditions.
Hazardous Failure Conditions must be no more frequent than Extremely Remote.
Catastrophic Failure Conditions must be Extremely Improbable.

While airplanes generally must be designed so that hazardous and catastrophic failure conditions are extremely remote or even extremely improbable, such failure conditions may nevertheless be monitored for, so that warning signals can be sent to the pilot and driver who may attempt to remedy the condition or try to land the aircraft. The monitoring and warning systems can be reliable and also involve certification.

Such certification standards have unfortunately had the effect of slowing commercial adoption and production of electric or hybrid aircraft. Electrical hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

There is therefore a need for simplified, yet robust, components and systems for an electric powered aircraft that simplify and streamline certifications requirements and reduce the cost and time required to produce a commercially viable electric aircraft.

Moreover, electrically driven aircrafts require high voltages for providing the necessary energy for flying, manoeuvring, starting and landing. The electrical energy often is provided by battery systems, with a nominal direct current (DC) voltage of about 400 to 800 V.

The main electrical power supply system of the aircraft normally is designed to operate at the said nominal DC voltage. Designing the electrical power supply system for higher voltages is highly desirable as it increases the nominal reach of the aircraft and/or the power and torque that can be generated by the motors.

It is well known that ohmic losses are proportional to the square of the electric current. Consequently, by reducing the electric current one can reduce losses, while the useful power transferred is unaffected if higher voltage levels are applied. This comes in harmony with a weight reduction, as cables with a smaller cross section can be used.

Higher system voltages on the other hand come at the cost of a limited selection for certified standard electric components, such as switches, semiconductors, cables, etc. for aircraft applications.

Higher voltages need furthermore better insulation of said components to provide a robust, reliable and safe electric or hybrid aircraft. Higher voltages without improving the insulation can be problematic, as components will age much faster due to partial discharge, which can be a concern for aircrafts flying at high altitudes. When components age faster, they need to be replaced more regularly to maintain the operation of the aircraft and reduce risks associated with a suspected failure.

However, such an increase in battery voltage leads to a corresponding increase in the withstand-voltage performance required for electrical elements such as cables, power converters, etc.

The problem is even worse for a power supply system intended to be mounted in an aircraft and thus fly at high altitude. In fact, Paschen's Law provides that the maximal voltage between terminals decreases as pressure is reduced. As a result, a power supply system designed for pressure at sea-level may be susceptible to arcing when flying at high altitude and in a low pressure. The insulation level of most equipment is being specified for normal service conditions, among which the normal altitude is 2000 m or below. If the equipment is used at an altitude higher than 2000 m, the insulation withstand level shall be determined by increasing the insulation level. The size, weight and cost of such equipment thus also increase.

SUMMARY OF DISCLOSURE

An aim of the present disclosure is the provision of an electrical power supply system for an electric or hybrid aircraft that is robust, sufficiently simple such as to facilitate a streamlined certification of the electric or hybrid aircraft, even with an increased system voltage.

Another aim of the present disclosure is the provision of an electrical power supply system for an electric or hybrid aircraft that makes use of certified electrical components, even with an increased system voltage.

A further aim of the present disclosure is the provision of an electrical power supply system that is configured to detect reliably hazardous or catastrophic failure conditions in said power supply system. This also facilitates streamlining the certification of the electric or hybrid aircraft, as it can be shown that hazardous or catastrophic failure conditions are reliably detected and measures for mitigation of catastrophic failure conditions can be applied accordingly.

According to an aspect, one or more of those aims can be achieved with an electrical power supply system for an electrically or hybrid driven aircraft comprising:
  an electrical power source
  a power converter connectable to a load, wherein
  the electrical power source is arranged to provide a first DC voltage with a first potential difference between a first DC potential output with a first polarity and a second DC potential output with a second polarity, and a third DC potential output having a potential between the potential at the first DC potential output and the potential at the second DC potential output, wherein
  the power converter is connected to the electrical power source and configured to provide a second voltage with a second potential difference between a first potential output and a second potential output, wherein
  the second potential difference is less than the first potential difference, wherein
  said load is connectable to the first potential output and to the second potential output of the power converter, and wherein
  the power converter is configured to electrically isolate the first DC voltage from the second voltage, wherein
  the second potential output of the power converter is connected to the third DC potential output of the electrical power source using a first connection comprising an impedance configured to limit an electric current.

The potential of the second potential output of the power converter is equal to the potential of the third DC potential output. In case of an isolation failure of the electrical power source, the impedance, for example, will limit the current flowing through a person being in contact with the electrical system. It means that a double isolation failure of the electrical power source must happen to put people at risk of electric shock.

According to another aspect, one or more of those aims can be achieved with an electrical supply network comprising:
  an electrical power supply system
  a controller, and
  a second connection configured to connect a first DC potential output of the electrical power source to the second potential output of the power converter, wherein the second connection comprising a second impedance configured to limit an electric current and comprising a first switch configured to interrupt the connection between the said DC potential output of the electrical power source and the second potential output of the power converter.

According to a further aspect, one or more of those aims can be achieved with a method for testing an insulation integrity of an electrical supply network comprising the steps of:
  determining the voltage across the first impedance
  controlling the first switch from the non-conducting state to the conducting state
  determining the voltage across the second impedance.

Voltage, electric potential difference, and potential difference can be used in the context of the disclosure herein interchangeably.

Connecting the second potential output of the power converter to the third DC potential output of the electrical power source, wherein the third DC potential output has a potential between the potential at the first DC potential output and the output at the second DC potential output, provides the advantage that the requirements for separating or insulating the first DC voltage from the second voltage can be relaxed.

In other words, the absolute value of the first DC voltage can be increased to a greater value, without the necessity to improve the insulation between the first DC voltage and the second voltage (airframe voltage). In addition, it will not reduce the lifetime of electronic components in charge of the isolation.

The insulation between said voltages inter alia is established with the power converter that is arranged to provide a separation between the voltages. This measure allows to use certified standard electronic components build for lower nominal voltages, even with an increased system voltage. This measure makes the power supply system also robust, as it is not necessary to make use of an improved insulation coordination.

Further advantages can be understood from the disclosure herein provided.

Using a first connection with an impedance reduces furthermore the risk of hazardous or catastrophic conditions in case of insulation failures in the electrical power source or in the electrical power supply system. On the other hand, this first connection ensures that the potential of the second potential output of the power converter is not floating or drifting away from the potential of the third DC potential output of the electrical power source and thus does not exceed the maximum voltage that the insulation can withstand.

The electrical power source can be a device arranged to provide electrical energy used by an electrical or an electronic equipment placed within the aircraft.

Such devices can be but are not limited to batteries, super capacitors, flywheels, fuel cells or fuel generators configured to provide electrical energy.

The power converter can convert a DC voltage at its input end to a DC voltage or DC current at its output end.

Alternatively, the power converter can an alternating current (AC) voltage or AC current with a variable frequency and a variable amplitude at its output end.

Input end or output end indicate in this context a flow of energy for a specific operational set point of the power converter, as the power converter can be designed to allow a flow of energy from an input end to an output end, for providing a load with electrical energy. The power converter can be designed in addition or alternatively to allow a flow of energy from an output end to an input end, for providing the electrical power source with electrical energy.

The absolute value or the peak-to-peak value of the voltage at the output end of the power converter can be lower than the absolute value of the DC voltage at its input end.

The power converter can feature at least two terminals at its output end. The first terminal can be referenced to a first potential output whereas the second terminal may be referenced to a second potential output.

The potential of the first output can be higher than the potential of the second output. Thus, a voltage or potential difference may exist between the first and second potential output of the power converter.

The potential of the second potential output might be regarded as the potential to which the remaining potentials or voltages of the electrical power supply system are referenced to, namely the airframe potential.

The power converter can feature more than two terminals or more than two potential outputs.

The power converter can supply a three-phase AC voltage or AC current system. In this specific case, the power converter can have three or more terminals and related potential outputs, whereas each of the potential outputs can be connected to one phase-line of the three-phase AC system.

The potential of one of the potential outputs of the power converter may be regarded as the potential to which all other potentials or voltages of the electrical power supply system are referenced to, also referred to as airframe potential.

The power converter can also feature a neutral point (star point), to which all other potentials of the electrical power supply system are referenced to.

The same applies when the power converter is configured to supply a standard one phase AC system. Here are normally all potentials and voltages referenced to the potential of the potential output that is connected to a neutral line.

The third DC potential output of the electrical power source can be connected to the potential output of the power converter to which the neutral line is connected.

The power converter can be arranged to electrically isolate the input end from the output end. In other words, the power converter can be configured to electrically separate or isolate the first DC voltage from the second voltage. This can also be understood as separating the electrical system on the input end from the electrical system on the output end of the power converter.

Power converters with input-output isolation typically use an internal transformer to electrically separate or isolate the input end from the output end. The electrical insulation of the power converter can be designed to withstand the full voltage range of the electrical power source, which corresponds in other words to the voltage between the first DC potential output and the second DC potential output.

The insulation of the power converter can be configured to withstand only the voltage between the first DC potential output and the third DC potential output or between the third DC potential output and the second DC potential output respectively. Other parts such as cables, electronic components in the power converter, etc. can also be designed to withstand the same voltage as outlined before.

The load may be connectable to the output end of the power converter. Connectable implies, that the load can be connected to and disconnected from the output end of the power converter.

The load can be an electrical or electronic equipment connectable to the output end of the power converter.

The load can consume electrical power at the output end of the power converter.

The load alternatively or in addition may also provide electrical energy to the output end of the power converter. The supplied electrical energy can be transformed or converted to electrical energy at the input end of the power converter.

The load can include for example an auxiliary equipment, such as displays, radio equipment, pumps, equipment for cooling, heating, or ventilation.

In any of the cases the load can be different from a motor converter.

For supplying other equipment, such as a motor for propelling the aircraft, a power converter with higher power ratings is required. So-called high-power converters can also feature an electrical insulation between the input end and the output end.

The electrical power source can provide at least three voltage levels with three different polarities.

The said voltage levels can be provided by connecting two voltage sources, each with a lower voltage rating, in series.

Each of the said voltage sources supply therefore a sub-voltage and contributes to the total level of the first potential difference, in particular to the level of the first DC voltage.

The electrical power source can supply higher currents by paralleling two in series connected voltage sources.

For example, a series connection of two cell modules can create an electrical power source with a first, second and third DC voltage output.

The third DC voltage output can be provided by the potential that is formed at the interconnection between the two cell modules.

The electrical power source may provide more than three DC voltage outputs when multiple voltage sources with lower voltage ratings are connected in series. In other words, the electrical power source in the configuration as explained before can provide more than three DC voltage potentials to the power converter.

In any case the electrical power source can provide the first DC voltage output with the first potential and the second DC voltage output with the second potential independently from the quantity of voltage sources with a lower voltage rating that are connected in series.

The second potential of the power converter at its output end may be connected to the third DC potential output of the electrical power source.

This interconnection can be established through an impedance. The impedance may comprise a resistive element, such as a resistor with a specified electrical resistance. Other electrical elements or components, such as inductors with a specified inductance or capacitors with a specified capacitance can be used to limit also an alternating current flow in the said interconnection.

The connection may feature an impedance that is arranged to limit a current flow in case of isolation failure between the high voltage side and low voltage side. Under normal operation conditions the current flow in the interconnection can be low, but useful to equilibrate the potentials.

The impedance mainly limits the current flow in case of a fault, such as an insulation fault, in the electrical power supply system.

For an electrical power supply system in accordance with the disclosure herein and according to the relevant technical standards, the electrical resistance of the resistive element is to be calculated dependent on the maximum voltage rating of the electrical power source. In other words, the electrical resistance of the resistive element is in particular dependent on the potential difference between the first and the second DC potential output of the electrical power supply.

According to the technical standard EN60947-1 a minimum resistance of 500Ω per Volt [500Ω/V] may be required.

The minimum resistance in accordance with the disclosure herein consequently may account to 400 kΩ for a nominal voltage rating of electrical power source of 800 V.

The resistance can stay unchanged, even when the system voltage, in particular the voltage difference between the first and the second DC potential output is doubled to 1600 V, when the second potential output of the power converter is connected to the third DC potential output. This means that it is possible to choose a minimum resistance of 400 kΩ even when the system voltage is doubled, by arranging the connection. To improve the safety and the availability of the power supply further, the resistance of resistive element may be further increased to a greater value. The electrical resistance may be greater or at least equal to 1 MΩ.

An electrical power supply system in accordance with the disclosure herein can further include a power converter that is connected to at least two of the three DC potential outputs of the electrical source. The input end of the power converter can be connected to the first DC potential output and to the second DC potential output of the electrical power source.

Alternatively, the power converter may be connected to the first DC potential output and to the third DC potential output, or to the third DC potential output and to the second DC potential output of the electrical power source.

The power converter can be also connected to all potential outputs of the electrical power source.

Power converters with two voltage levels, also known as two level power converter, typically make use of two DC potential outputs of the electrical power source wherein three- or multilevel power converter typically make use of three (or more) DC potential outputs.

Power converters with more than two levels are typically used for high power applications, as they feature an improved electromagnetic compatibility (EMC) characteristic.

A multilevel power converter may feature more than two input terminals and can be connected to further DC potential outputs, in case the electrical power source is configured with more than three DC potential outputs.

An electrical power supply system in accordance with the disclosure herein can comprise a specific connection for connecting the second potential output of the power converter to an electrical ground of the aircraft. The connection between second potential output of the power converter and the electrical ground can be configured as a direct connection or a connection comprising an impedance.

The said electrical ground is used as a well-defined reference potential for all electrical and electronic devices in the aircraft.

Electrically conductive surfaces such as metallic housings of devices, structural metallic elements of the aircraft, etc. may also be connected to the electrical ground, with the aim to protect passengers from high potential differences, also known as touch potential.

It needs to be noted that the electrical ground and the second potential output of the power converter to which all potentials of the electrical power supply system may be referenced to, usually share the same potential as they are interconnected.

An electrical power supply system in accordance with the disclosure herein can hold a potential at the first DC potential output and a potential at the second DC potential output with the same absolute value with reference to a potential of the second potential output of the power converter but with different polarities thereto. Alternatively or in addition are the potentials referenced to the potential of the airframe potential, when the second potential output of the power converter is connected to electrical ground.

The potential at the first DC potential output may be between +400 V and +800 V, the potential at the second DC potential output (DC−) may be between −400 V and −800 V and the potential at the third DC potential output may be 0 V, with reference to the potential of the second potential output of the power converter or with reference to electrical ground which might be connected to the second potential output of the power converter, using a direct connection or a connection configured with an impedance.

This can be advantageous, as the potentials may be symmetrical to each other and symmetrical to the third DC potential output.

This may simplify the insulation coordination of the electrical power supply system drastically, as only one class of insulating material may be used. Further advantages can be deducted for the method for testing the insulation integrity, as disclosed in one of the following paragraphs.

Moreover it can be advantageous to arrange the electrical power source in accordance with the disclosure herein, with an absolute value of the first potential difference that is greater than 800 V or greater than or equal to 1600 V.

An electrical power supply system for an aircraft may operate at a voltage of 650 V. Increasing the voltage to the levels as indicated herein may reduce the losses in the electrical power supply system significantly. Alternatively, or in addition, the use of thinner cables and smaller components is enabled, which can significantly reduce weight.

An electrical power supply system in accordance with the disclosure herein can include an electrical power source that features at least one first set of battery modules for providing a first DC sub-voltage with a voltage level between the first DC potential output and the third DC potential output and at least one second set of battery modules for providing a second DC sub-voltage with a level between the second DC potential output and the third DC potential output.

The battery modules may be interconnected to provide said DC potential outputs.

A battery module or battery module assembly is a module that consists of multiple battery cells connected in series and/or parallel, to be encased in a mechanical structure.

The first set of battery modules and the second set of battery modules can be comprised in one common battery pack.

The battery pack may be configured to provide at least the three DC potential outputs, namely the first, second and third DC potential output of the electrical power supply.

An electrical power supply system in accordance with the disclosure herein may include an electrical power source whereas the electrical power source features a first battery pack for providing a first DC sub-voltage with a voltage level between the first DC potential output and the third DC potential output and a second battery pack for providing a second DC sub-voltage with a voltage level between the second DC potential output and the third DC potential output.

Each of the battery packs may include multiple battery modules interconnected with each other.

Providing an electrical power source arranged with multiple battery packs can be advantageous, as each of the at least two battery packs can be located in different portions of the aircraft, such as in a wing portion or in a front or rear portion of the aircraft.

Distributing the battery packs provides an aircraft with a balanced weight distribution and consequently with proper aerodynamic properties.

Alternatively or in addition, the battery packs, particularly the output terminals of said battery packs, can be interconnected with each other to provide the at least three DC potential outputs, namely the first, second and third DC potential.

An electrical power supply system in accordance with the disclosure herein can include an electrical power source with a series connection of the first set of battery modules and the second set of battery modules.

Alternatively or in addition, the electrical power source may be arranged with a series connection of the first battery pack and of the second battery pack for providing the DC voltage between the first DC potential output and the second DC potential output.

A parallel connection of multiple battery modules or battery packs can be used to provide an electrical power source with improved current supply capabilities.

Suitable connectors with a sufficient cross-section and electrical insulation can be used to establish the series or parallel connection of the battery modules or battery packs.

An electrical supply network in accordance with the disclosure herein may feature a controller.

The controller for example can be an electronic control device such as a microcontroller, FPGA, or a combination of analogue and digital circuitry. The controller may feature analogue or digital inputs and outputs, configured to measure analogue values and arranged to receive or send control command from or to external control devices.

The electrical supply network further may feature a second connection for connecting one of the DC potential outputs of the electrical power source to the second potential output of the power converter. This can be either the first DC potential output or the second DC potential output that can be connected to the second potential output of the power converter.

As said before the second potential output of the power converter can be at the same potential as the electrical ground. The impedance may have the same configuration as explained for the electrical power supply system before.

The impedance can be a single component, such as a resistor, capacitor or inductor or any combination thereof.

The second connection may feature a switch. The switch may be a mechanical switch, such as a relay or a contactor, configured to interrupt the second connection.

Mechanical switches may be arranged to have two states, namely a conducting state and a non-conducting state.

The switch alternatively can be an electronic switch featuring a set of semiconductors that can be controlled between a non-conducting and a conducting state.

The switches can be configured as a normally-on or a normally-off switch. The latter can have the advantage that the second connection is interrupted, even when electrical energy is missing to control the state of the switch.

The disclosure is also related to an electrical supply network in accordance with the disclosure herein, wherein the controller is configured to control the first switch between a non-conducting and a conducting state.

The controller can feature control outputs, whereas the switch may feature corresponding control inputs. The control inputs of the controller may be connected to the control inputs of the switch using hard wired cable connection.

The conducting state of the switch can establish an electrical connection between said first DC potential output of the electrical power source and the second potential output of the power converter, whereas the non-conducting state is correspondingly the contrary.

The disclosure is also related to an electrical supply network in accordance with the disclosure herein, wherein the controller is configured to determine a voltage across the first impedance and the second impedance or alternatively across the first impedance or second impedance only.

The controller can feature analogue inputs for measuring analogue values of an output of a voltage sensor that is connected to the analogue input of the control device.

The voltage sensor may be connected at an input to at least one of the said impedances, to determine the voltage across said impedance.

A voltage can be measured in case of a current flow through said impedances. Under normal operational conditions, the voltage across the first impedance may be zero or close to zero. It can be assumed that a fault state of the electrical power supply and in addition or alternatively in the electrical supply network is present when a voltage is measured across the first impedance.

The present disclosure is also related to an electrical supply network in accordance with the disclosure herein, wherein the electrical supply network can feature a third connection configured to connect a second DC potential output of the electrical power source to the second potential output of the power converter.

This second potential output can be either the first DC potential output or the second DC potential output of the electrical power source that is connected to the second potential output of the power converter, but it should be a DC potential output that is not already connected to the second potential output of the power converter using the second connection as detailed before.

It may be required to detect a current flowing from the first DC potential output to the second potential output of the power converter and alternatively or in addition required to detect a current flowing from the second DC potential output to the second potential output of the power converter.

It can be advantageous to detect a current flowing in all connections to be able to distinguish between normal operational conditions and fault conditions of the electric power supply system or electric power supply network.

The third connection may include a third impedance configured to limit an electric current. The impedance can have the same configuration as explained for the electrical power supply system.

The impedance can also be a single component, such as a resistor, capacitor or inductor or any combination thereof.

The electrical supply network may comprise a second switch configured to interrupt the connection between the said DC potential output of the electrical power source and the second potential output of the power converter.

The switch can have the same configuration as the switch comprised in the second connection and as disclosed before.

The present disclosure is also related to an electrical supply network in accordance with the disclosure herein, wherein the controller control the second switch between a non-conducting and a conducting state.

The controller can be furthermore determine a voltage across the third impedance.

The configuration as disclosed with regards to the second connection may also apply to the third connection.

The present disclosure is also related to an electrical supply network in accordance with the disclosure herein, wherein the ohmic resistance of the impedance of the second and third connection can be greater than 400 kΩ or greater than or equal to 1 MΩ.

The present disclosure is also related to an electrical supply network in accordance with the disclosure herein, where the first, second and third connection may comprise an electrical cable with a conductor and an electrical insulation enclosing the conductor.

Alternatively, at least one of the connections may include an electrical cable.

The cable can include an insulation that is configured to withstand a potential difference between the first DC potential output or the second DC potential output with respect to a potential of the third DC potential output.

Consequently, the insulation of the cable may be configured to withstand only a portion of the total potential difference of the first potential difference.

In case the potential of the first DC potential output and the second DC potential are symmetrical with respect to the potential of the third DC potential, the insulation of the cable may only be configured to withstand one half of the potential difference of the first voltage difference.

The insulation of the cable may be configured to withstand a potential difference which is less than the potential difference between the first DC potential output and the second DC potential output of the electrical power source.

This can be advantageous as a cable configured for lower voltage levels needs less or a less sophisticated insulation material. The same may apply to any other component of the electrical power supply system, configured with an insulation.

The present disclosure is also related to an electrically driven aircraft in accordance with the disclosure herein may be equipped with the electrical power supply system or with the electrical supply network or with a combination of both, following one of the before outlined embodiments.

The present disclosure provides multiple components and systems that can be mixed and matched according to aircraft needs and requirements. Accordingly, although multiple different components are described below, the components or systems are not required to be all used together in a single embodiment. Rather, each component or system can be used independent of the other components or systems of the present disclosure.

BRIEF DESCRIPTION OF THE DRAWINGS

Embodiments of the disclosure are described with respect to and illustrated by the drawings in which.

DETAILED DESCRIPTION

System Overview

Figure 1A:
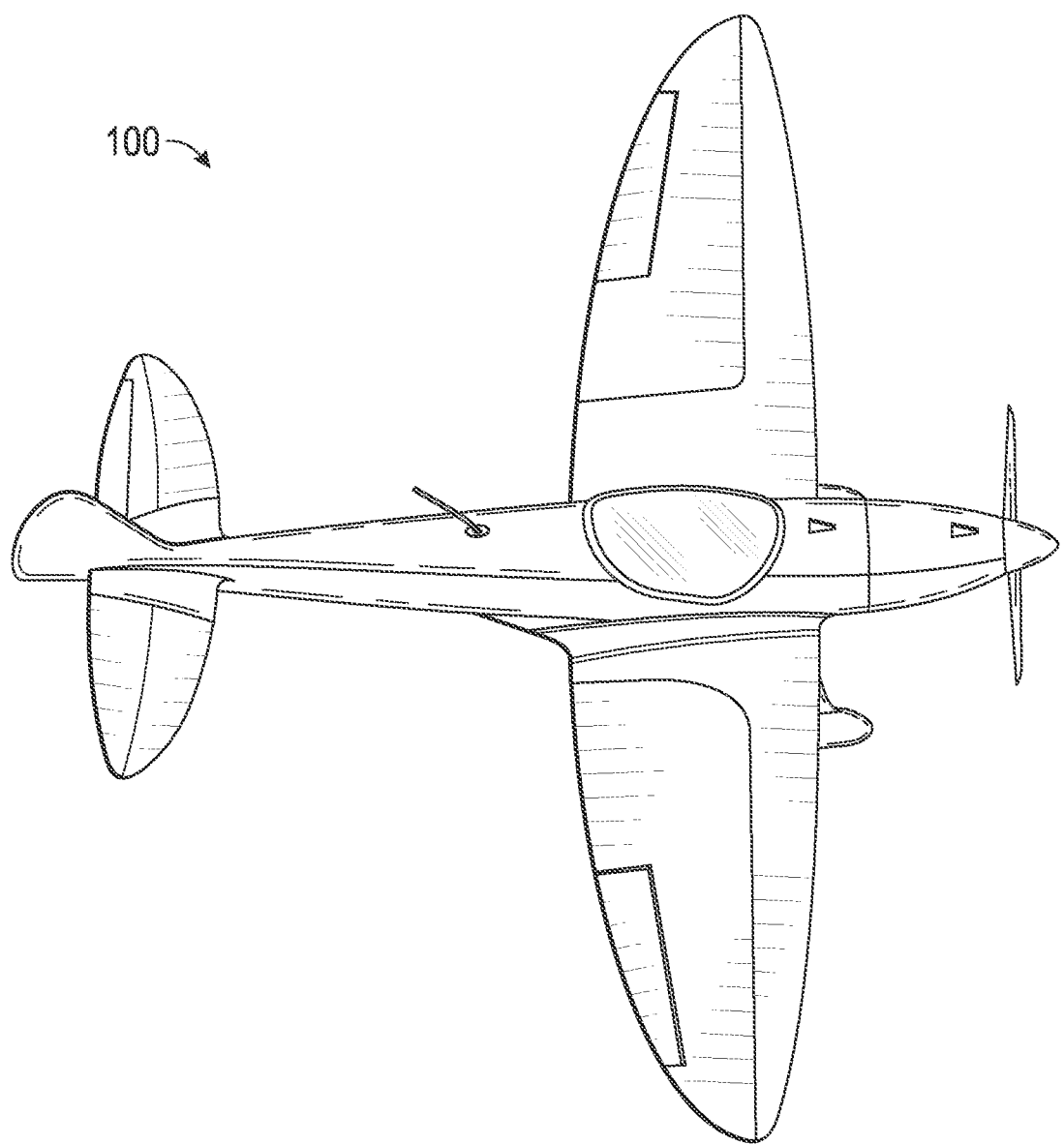
FIG. 1A illustrates an aircraft, such as an electric or hybrid aircraft.
Figure 1B:
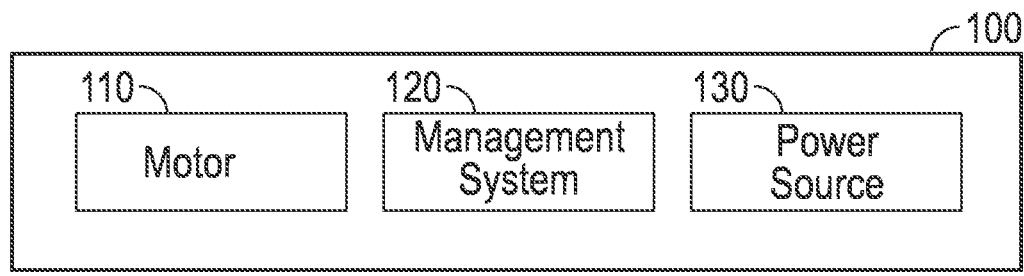
FIG. 1B illustrates a simplified block diagram of an aircraft.

FIG. 1A illustrates an aircraft 100, such as an electric or hybrid aircraft, and FIG. 1B illustrates a simplified block diagram of the aircraft 100. The aircraft 100 includes a motor 110, a management system 120, and a power source 130. The motor 110 can be used to propel the aircraft 100 and cause the aircraft 100 to fly and navigate. The management system 120 can control and monitor the components (for example, equipment) of the aircraft 100, such as the motor 110 and the power source 130. The power source 130 can power the motor 110 to drive the aircraft 100 and power the management system 120 to enable operations of the management system 120. The management system 120 can include one or more motor controllers as well as other electronic circuitry for controlling and monitoring various components of the aircraft 100.

Figure 2:
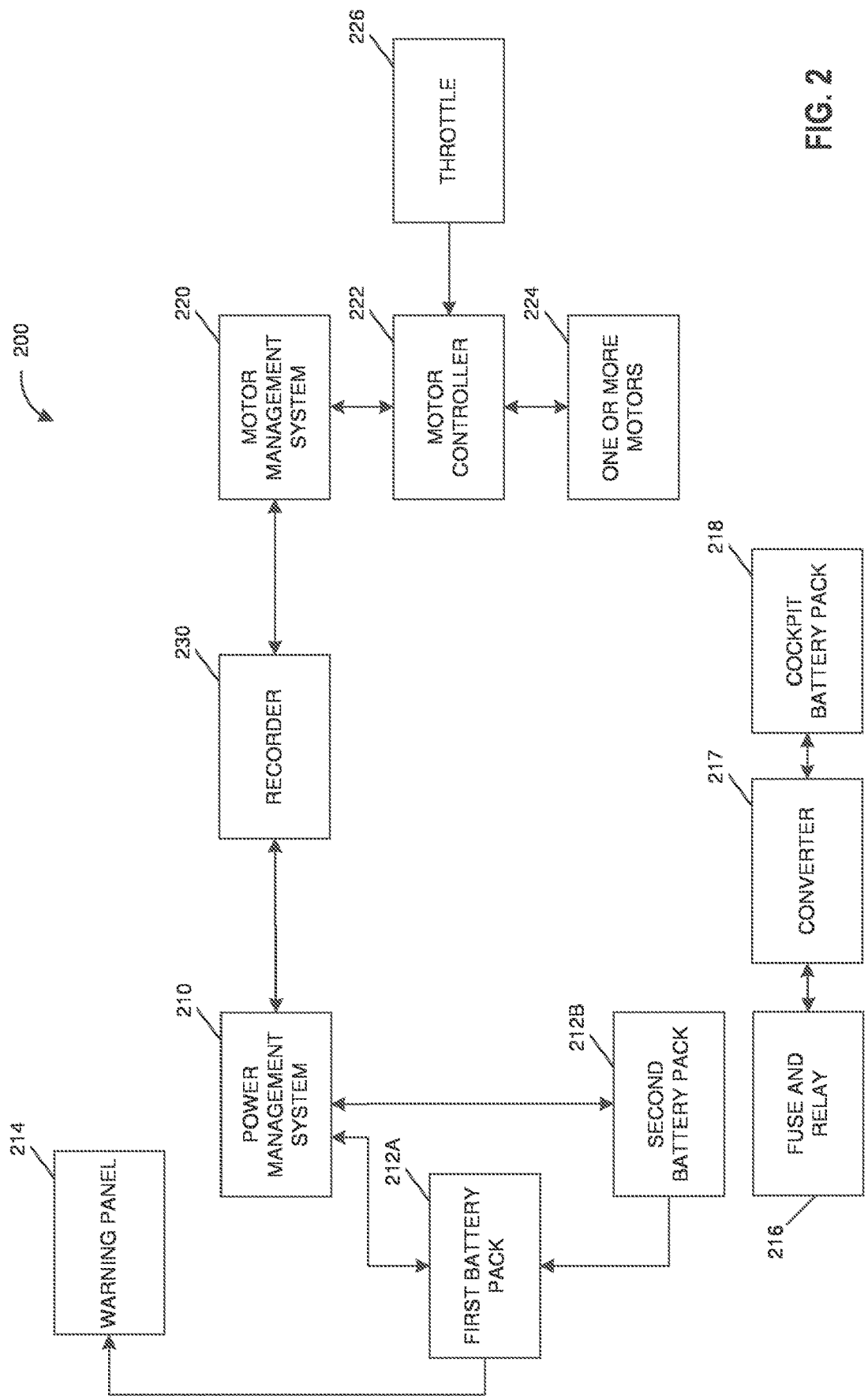
FIG. 2 illustrates management systems for operating an aircraft.

FIG. 2 illustrates components 200 of an aircraft, such as the aircraft 100 of FIGS. 1A and 1B. The components 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218. The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller can include an inverter for generating AC currents that are needed for operating the one or more motors. The motor controller 222 may further operate according to instructions from the throttle 226 that may be controlled by a pilot of the aircraft. The one or more motors can include an electric brushless motor.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 can be assigned respective functions, for example, according to system configurations, such as one or more memory flags in memory that indicate a desired functionality. The power management system 210 and the motor management system 220 may include the same or similar computer hardware.

The power management system 210 can automatically perform the motor management functions when the motor management system 220 is not operational (such as in the event of a rebooting or failure of the motor management system 220), and the motor management system 220 can automatically perform the power management functions when the power management system 210 is not operational (such as in the event of rebooting or failure of the power management system 210). Moreover, the power management system 210 and the motor management system 220 can take over the functions from one another without communicating operation data, such as data about one or more of the components being controlled or monitored by the power management system 210 and the motor management system 220. This can be because both the power management system 210 and the motor management system 220 may be consistently monitoring communications on the communication bus to generate control information, but the control information may be used if the power management system 210 and the motor management system 220 has primary responsibility but not if the power management system 210 and the motor management system 220 does not have primary responsibility. Additionally or alternatively, the power management system 210 and the motor management system 220 may access data stored by the recorder 230 to obtain information usable to take over primary responsibility.

System Architecture

Electric and hybrid aircraft (rather than aircraft powered during operation by combustion) have been designed and manufactured for decades. However, electric and hybrid aircraft have still not yet become widely used for most transport applications like carrying passengers or goods.

This failure to adopt may be in large part because designing an aircraft that is sufficiently safe to be certified by certification authorities may be very difficult. The certification of prototypes may moreover not be sufficient to certify for commercial applications. Instead, a certification of each individual aircraft and its components may be required.

This disclosure provides at least some approaches for constructing electric powered aircraft from components and systems that have been designed to pass certification requirements so that the aircraft itself may pass certification requirements and proceed to active commercial use.

Certification requirements can be related to a safety risk analysis. A condition that may occur with an aircraft or its components can be assigned to one of multiple safety risk assessments, which may in turn be associated with a particular certification standard. The condition can, for example, be catastrophic, hazardous, major, minor, or no safety effect. A catastrophic condition may be one that likely results in multiple fatalities or loss of the aircraft. A hazardous condition may reduce the capability of the aircraft or the operator ability to cope with adverse conditions to the extent that there would be a large reduction in safety margin or functional capability crew physical distress/excessive workload such that operators cannot be relied upon to perform required tasks accurately or completely or serious or fatal injury to small number of occupants of aircraft (except operators) or fatal injury to ground personnel or general public. A major condition can reduce the capability of the aircraft or the operators to cope with adverse operating condition to the extent that there would be a significant reduction in safety margin or functional capability, significant increase in operator workload, conditions impairing operator efficiency or creating significant discomfort physical distress to occupants of aircraft (except operator), which can include injuries, major occupational illness, major environmental damage, or major property damage. A minor condition may not significantly reduce system safety such that actions required by operators are well within their capabilities and may include a slight reduction in safety margin or functional capabilities, slight increase in workload such as routine flight plan changes, some physical discomfort to occupants or aircraft (except operators), minor occupational illness, minor environmental damage, or minor property damage. A no safety effect condition may be one that has not effect on safety.

An aircraft can be designed so that different monitoring and warning subsystems, such as battery monitoring circuits, of the aircraft are constructed to have a robustness corresponding to their responsibilities and any related certification standards, as well as potentially any subsystem redundancies.

Where a potential failure of the responsibilities of a monitoring and warning subsystem would likely be catastrophic, the subsystem can be designed to be simple and robust and thus may be able to satisfy difficult certification standards. The subsystem, for instance a battery, motor or motor controller monitoring circuit, can be composed of non-programmable, non-stateful components (for example, analog or non-programmable combinational logic electronic components) rather than programmable components (for example, a processor, a field programmable gate array (FPGA), or a complex programmable logic device (CPLD)) or stateful components (for example, sequential logic electronic components) and activate indicators such as lights rather than more sophisticated displays.

On the other hand, where either (i) a monitoring and warning subsystem (such as a battery monitoring circuit, a motor monitoring circuit or a motor controller monitoring circuit) of an aircraft monitors a parameter redundantly with another subsystem of the aircraft that is composed of non-programmable, non-stateful components or (ii) a potential failure of the responsibilities of such a monitoring and warning subsystem would likely be less than catastrophic, or less than hazardous, the subsystem can be at least partly digital and designed to be complicated, feature-rich, and easier to update and yet able to satisfy associated certification standards. Such a subsystem can, for instance, include a processor or other programmable components that outputs information to a sophisticated display for presentation.

In some implementations, some or all catastrophic conditions monitored for by an aircraft can be monitored for with at least one monitoring and warning subsystem that does not include a programmable component or a stateful component because certifications for programmable components or stateful components may demand statistical analysis of the responsible subsystems, which can be very expensive and complicated to certify. Such implementations can moreover be counterintuitive at least because an electric or hybrid aircraft may include one or more relatively advanced programmable or stateful components to enable operation of the electric or hybrid aircraft, so the inclusion of one or more subsystems in the aircraft that does not include any programmable components or any stateful components may be unexpected because the one or more relatively advanced programmable or stateful components may be readily and easily able to implement the functionality of the one or more subsystems that does not include any programmable components or any stateful components.

An aircraft monitoring system can include a first monitoring and warning subsystem and a second monitoring and warning subsystem. The second subsystem, such as a second battery monitoring circuit, can be supported by an aircraft housing and include non-programmable, non-stateful components, such as analog or non-programmable combinational logic electronic components. The non-programmable, non-stateful components can monitor a component (such as battery cells in a battery pack) supported by the aircraft housing and output a second alert to notify of a catastrophic condition associated with the component. The non-programmable, non-stateful components can, for instance, activate an indicator or an audible alarm for a passenger aboard the housing to output the first alert. The indicator or audible alarm may remain inactive unless the indicator is outputting the first alert. Additionally or alternatively, the non-programmable, non-stateful components can output the second alert to a computer aboard or remote from the aircraft (for example, to automatically trigger actions to attempt to respond to or address the catastrophic condition, such as to stop charging or activate a fire extinguisher, a parachute, or an emergency landing procedure or other emergency response feature) or an operator of the aircraft via a telemetry system. The non-programmable, non-stateful components may, moreover, not be able to control the component or at least control certain functionality of the component, such as to control a mode or trigger an operation of the component.

The first subsystem, such as a first battery monitoring circuit, can be supported by the aircraft housing and include a processor (or another programmable or stateful component), as well as a communication bus. The processor can monitor the component from communications on the communication bus and output a first alert to notify of a catastrophic condition or a less than catastrophic condition associated with the component. The processor can, for instance, activate an indicator or audible alarm for a passenger aboard the housing to output the first alert. Additionally or alternatively, the processor can output the first alert to a computer aboard or remote from the aircraft (for example, to automatically trigger actions to attempt to address the catastrophic condition, such as to activate a fire extinguisher, a parachute, or an emergency landing procedure) or an operator of the aircraft via a telemetry system. The processor may control the component.

The non-programmable, non-stateful components of the second subsystem additionally may not be able to communicate via the communication bus. It may not include any programmable communication circuit for allowing communication via such a bus.

An example of such a design and its benefits are next described in the context of battery management systems. Notably, the design can be additionally or alternatively applied to other systems of a vehicle that perform functions other than battery management, such as motor and motor control.

Figure 3:
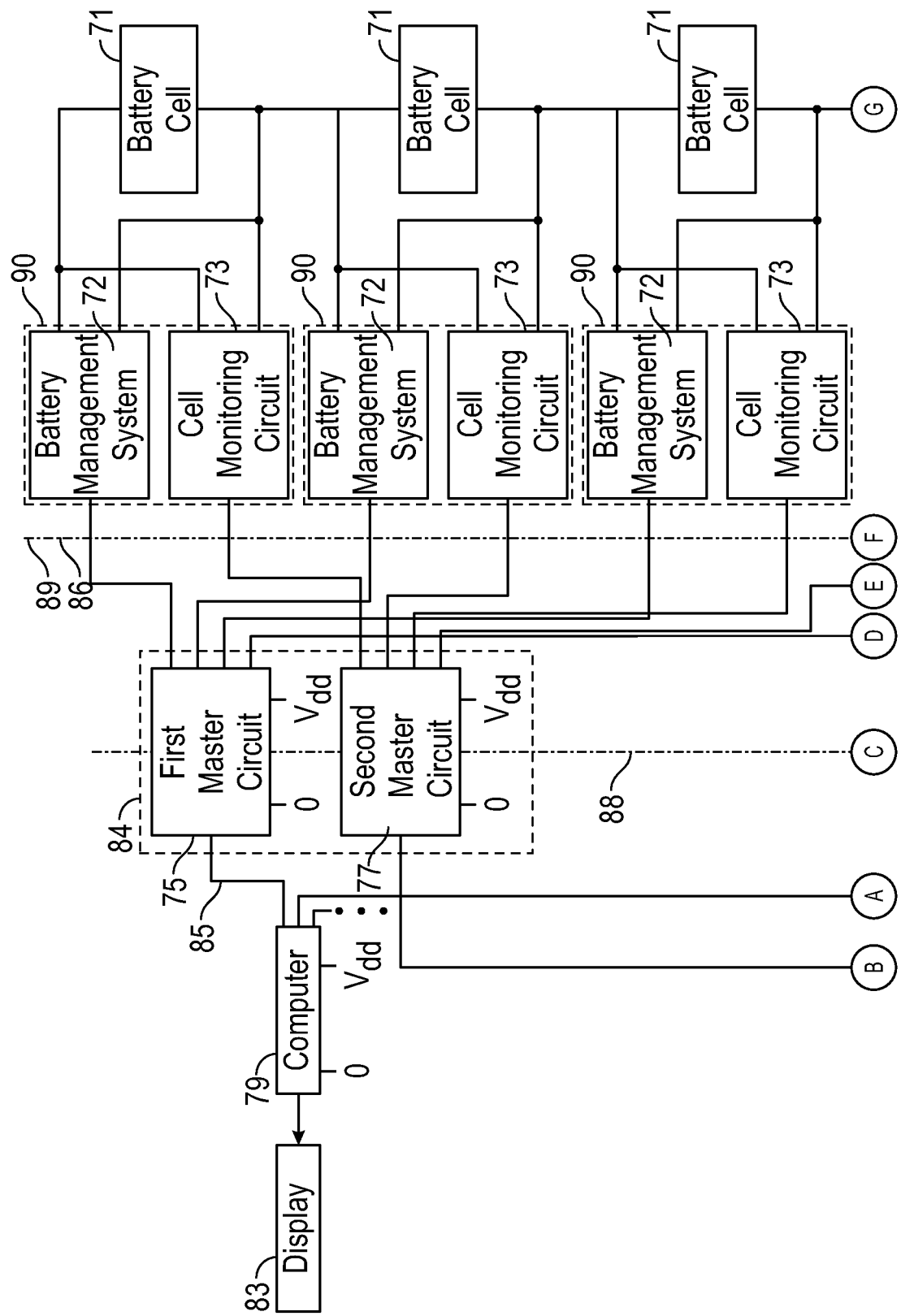
FIG. 3 illustrates a battery monitoring system for an aircraft.
Figure 3:
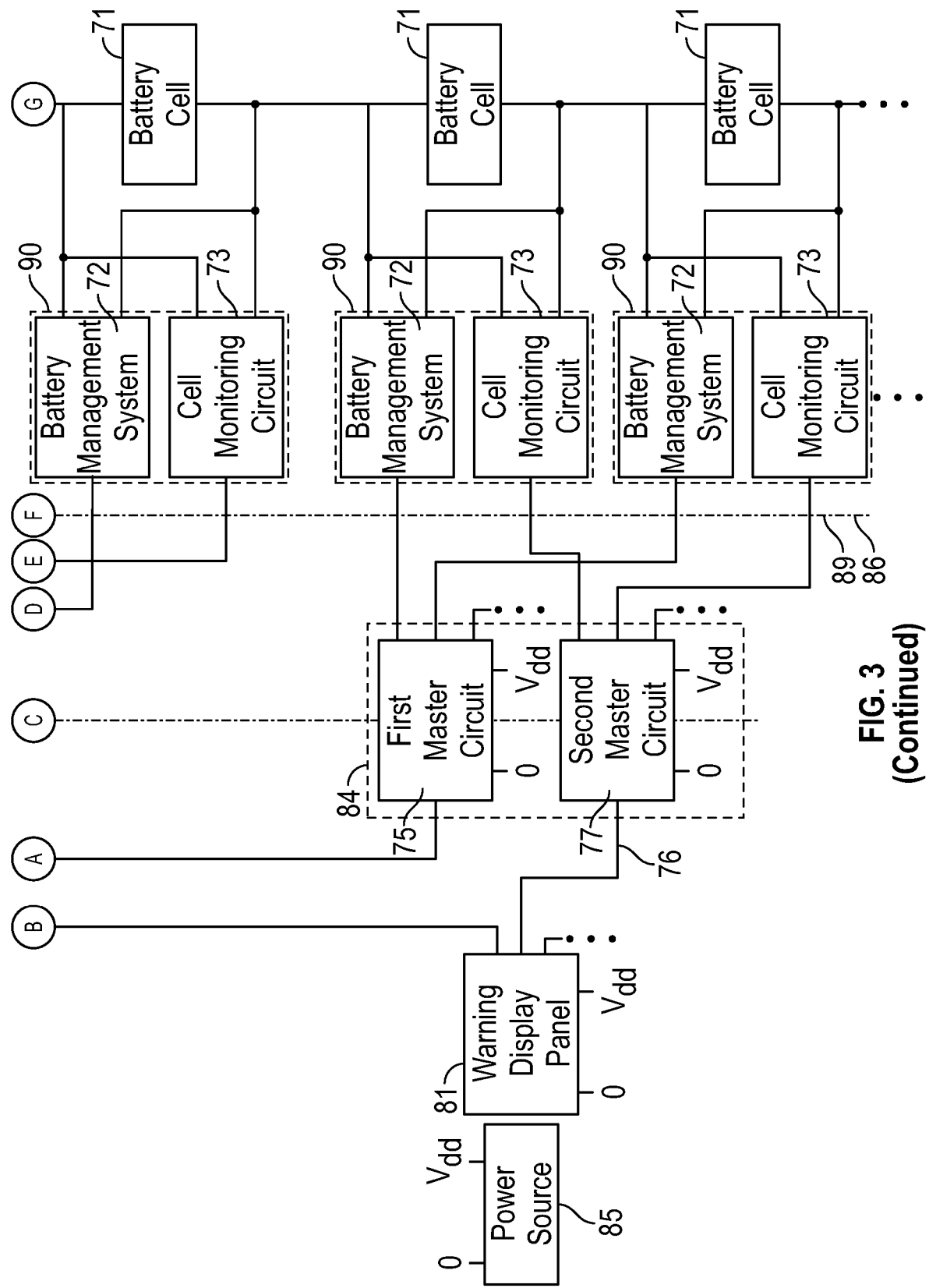

FIG. 3 illustrates a battery monitoring system. This system can be used in an electric vehicle, such as an electric aircraft, a large size drone or unmanned aerial vehicle, an electric car, or the like, to monitor the state of battery cells 71 in one of multiple battery packs and report this state or generate warning signals in case of dysfunctions.

The battery cells 71 can be connected in series or in parallel to deliver a desired voltage and current. FIG. 3 shows serially connected battery cells. The total number of battery cells 71 may exceed 100 cells in an electric aircraft. Each of the battery cells 71 can be made up of multiple elementary battery cells in parallel.

Figure 4:
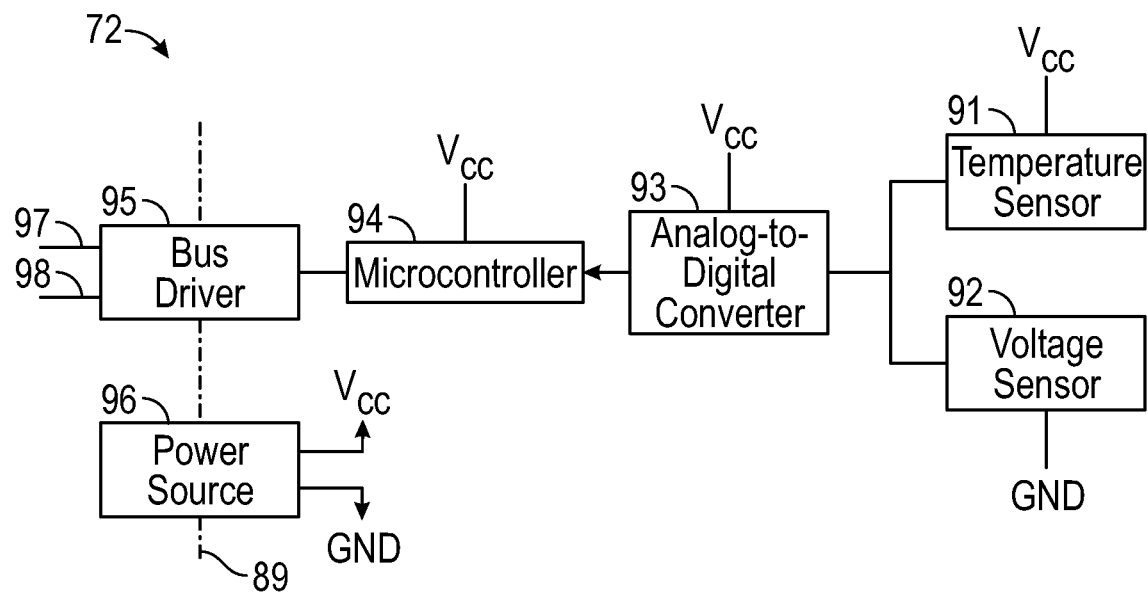
FIG. 4 illustrates an implementation of battery monitoring circuits.

A first battery monitoring circuit can control and monitor the state of each battery cell 71. The first battery management circuit can include multiple BMSs 72, each of the BMSs 72 managing and controlling one of the battery cells 71. The BMSs 72 can each be made up of an integrated circuit (for instance, a dedicated integrated circuit) mounted on one printed circuit board (PCB) of the PCBs 90. One of the PCBs 90 can be used for each of the battery cells 71 or for a group of battery cells. FIG. 4 illustrates example components of one of the BMSs 72.

The control of a battery cell can include control of its charging and discharge cycles, preventing a battery cell from operating outside its safe operating area, or balancing the charge between different cells.

The monitoring of one of the battery cells 71 by one of the BMSs 72 can include measuring parameters of the one of the battery cells 71, to detect and report its condition and possible dysfunctions. The measurement of the parameters can be performed with battery cell parameter sensors, which can be integrated in the one of the BMSs 72 or connected to the one of the BMSs 72. Examples of such parameter sensors can include a temperature sensor 91, a voltage sensor 92, or a current sensor. An analog-to-digital converter 93 can convert the analog values measured by one or more of the parameter sensors into multivalued digital values, for example, 8 or 16 bits digital parameter values. A microcontroller 94, which can be part of each of the BMSs 72, can compare the values with thresholds to detect when a battery cell temperature, battery cell voltage, or battery cell current is outside a range.

The BMSs 72 as slaves can be controlled by one of multiple first master circuits 75. In the example of FIG. 3, each of the first master circuits 75 can control four of the BMSs 72. Each of the first master circuits 75 can control eight of the BMSs 72, or more than eight of the BMSs 72. The first master circuits 75 can control more BMS and more battery cells in yet other implementations. The first master circuits 75 can be connected and communicate over a digital communication bus 85.

The first master circuits 75 can also be connected to a computer 79 that collects the various digital signals and data sent by the first master circuits 75, and may display information related to the battery state and warning signals on a display 83, such as a matrix display. The display 83 may be mounted in the vehicle's cockpit to be visible by the vehicle's driver or pilot. Additionally or alternatively, the computer 79 can output the information to a computer remote from the aircraft or to control operations of one or more components of the aircraft as described herein.

The BMSs 72 can be connected to the first master circuits 75 over a digital communication bus, such as a CAN bus. A bus driver 95 can interface the microcontroller 94 with the digital communication bus and provide a first galvanic isolation 89 between the PCBs 90 and the first master circuits 75. In one example, the bus drivers of adjacent BMSs 72 can be daisy chained. For example, as shown in FIG. 4, the bus driver 95 is connected to the bus driver 97 of the previous BMS and to the bus driver 98 of the next BMS.

Each of the BMSs 72 and their associated microcontrollers can be rebooted by switching its power voltage Vcc. The interruption of Vcc can be controlled by the first master circuits 75 over the digital communication bus and a power source 96.

FIG. 3 further illustrates a second battery monitoring circuit, which can be redundant of the first battery monitoring circuit. This second battery monitoring circuit may not manage the battery cells 71; for example, the second battery monitoring circuit may not control charge or discharge cycles of the battery cells 71. The function of the second battery monitoring circuit can instead be to provide a separate, redundant monitoring of each of the battery cells 71 in the battery packs, and to transmit those parameters or warning signals related to those parameters, such as to the pilot or driver or a computer aboard or remote from the aircraft as described herein. The second battery monitoring circuit can monitor the state of each of the battery cells 71 independently from the first battery monitoring circuit. The second battery monitoring circuit can include one of multiple cell monitoring circuits 73 for each of the battery cells. The parameters or warning signals may moreover, for example, be used by the second battery monitoring circuit to stop charging (for instance, by opening a relay to disconnect supply of power) of one or more battery cells when the one or more battery cells may be full of energy and a computer of the aircraft continues to charge the one or more battery cells.

Motor and Battery System

Battery packs including multiple battery cells, such as lithium-ion cells, can be used in electric cars, electric aircraft, and other electric self-powered vehicles. The battery cells can be connected in series or in parallel to deliver an appropriate voltage and current.

In electrically driven aircraft, the battery packs can be chosen to fulfil the electrical requirements for various flight modes. During short time periods like take off, the electrical motor can utilize a relatively high power. During most of the time, such as in the standard flight mode, the electrical motor can utilize a relatively lower power, but may consume a high energy for achieving long distances of travel. It can be difficult for a single battery to achieve these two power utilizations.

The use of two battery packs with different power or energy characteristics can optimize the use of the stored energy for different flight conditions. For example, a first battery pack can be used for standard flight situations, where high power output may not be demanded, but a high energy output may be demanded. A second battery pack can be used, alone or in addition to the first battery pack, for flight situations with high power output demands, such as take-off manoeuvring.

An electrical powering system can charge the second battery pack from the first battery pack. This can allow recharging of the second battery pack during the flight, subsequent to the second battery pack being used in a high power output demanding flight situation. Therefore, the second battery pack can be small, which can save space and weight. In addition, this can allow different battery packs for different flight situations that optimize the use of the battery packs.

The electrical powering system can also charge the second battery pack by at least one motor which works as generator (the motor may also accordingly be referred to as a transducer). This can allow recharging of the second battery pack during the flight or after the second battery pack has been used in a high power output demanding flight situation. Therefore, the second battery pack can be small, which can save space and weight. In addition, the different battery packs can allow the recovery of braking energy. Braking energy during landing or sinking recovered by a generator motor can create high currents which may not be recovered by battery packs used for traveling long distances. By using a second battery pack suitable for receiving high power output in a short time, more braking energy can be recovered via the second battery pack than the first battery pack, for example.

The electrical powering system can also include a third battery pack, which includes a supercapacitor. Because supercapacitors can receive and output large instantaneous power or high energy in a short duration of time, the third battery pack can further improve the electrical powering system in some instances. A supercapacitor may, for example, have a capacitance of 0.1 F, 0.5 F, 1 F, 5 F, 10 F, 50 F, 100 F, or greater or within a range defined by one of the preceding capacitance values.

Modular Battery System

The power sources in an electric or hybrid aircraft can be modular and distributed to optimize a weight distribution or select a center of gravity for the electric or hybrid aircraft, as well as maximize a use of space in the aircraft. Moreover, the batteries in an electric or hybrid aircraft can desirably be designed to be positioned in place of a combustion engine so that the aircraft can retain a similar shape or structure to a traditional combustion powered aircraft and yet may be powered by batteries. In such designs, the weight of the batteries can be distributed to match that of a combustion engine to enable the electric or hybrid aircraft to fly similarly to the traditional combustion powered aircraft.

Figure 5A:
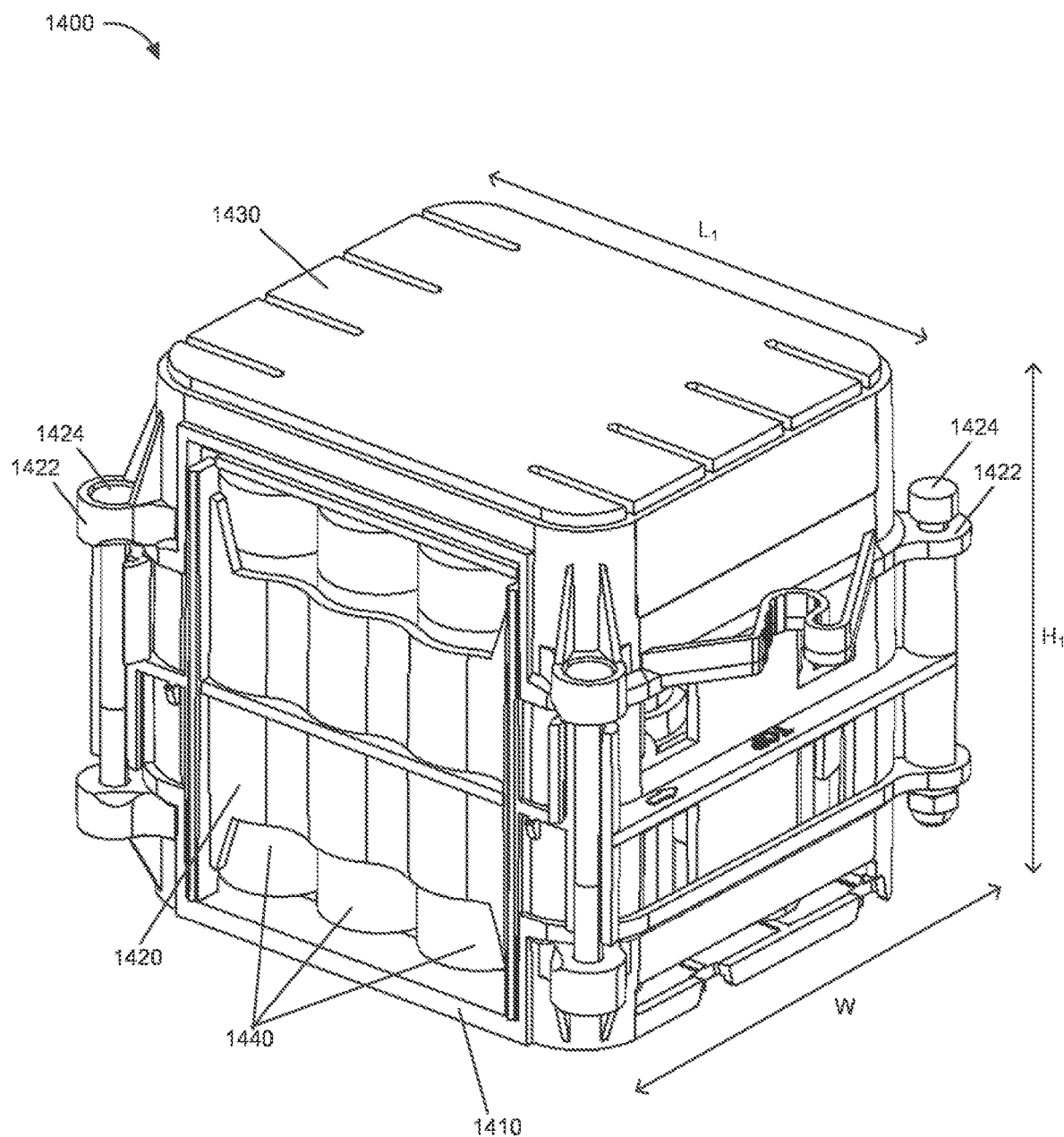
FIGS. 5A and 5B illustrate a battery module usable in an aircraft.

FIG. 5A illustrates a battery module 1400 usable in an aircraft, such as the aircraft 100 of FIGS. 1A and 1B. The battery module 1400 can include a lower battery module housing 1410, a middle battery module housing 1420, an upper battery module housing 1430, and a multiple battery cells 1440. The multiple battery cells 1440 can together provide output power for the battery module 1400. The lower battery module housing 1410, the middle battery module housing 1420, or the upper battery module housing 1430 can include slots, such as slots 1422, that are usable to mechanically couple the lower battery module housing 1410, the middle battery module housing 1420, or the upper battery module housing 1430 to one another or to another battery module. Supports, such as supports 1424 (for example, pins or locks), can be placed in the slots to lock the lower battery module housing 1410, the middle battery module housing 1420, or the upper battery module housing 1430 to one another or to another battery module.

The battery module 1400 can be constructed so that the battery module 1400 is evenly cooled by air. The multiple battery cells 1440 can include 16 total battery cells where the battery cells are each substantially shaped as a cylinder. The lower battery module housing 1410, the middle battery module housing 1420, or the upper battery module housing 1430 can be formed of or include plastic and, when coupled together, have an outer shape substantially shaped as a rectangular prism. The lower battery module housing 1410, the middle battery module housing 1420, or the upper battery module housing 1430 can together be designed to prevent a fire in the multiple battery cells 1440 from spreading outside of the battery module 1400.

The battery module 1400 can have a length of L1, a width of W, and a height of H1. The length of L1, the width of W, or the height of H1 can each be 50 mm, 65 mm, 80 mm, 100 mm, 120 mm, 150 mm, 200 mm, 250 mm or within a range defined by two of the foregoing values or another value greater or less than the foregoing values.

Figure 5B:
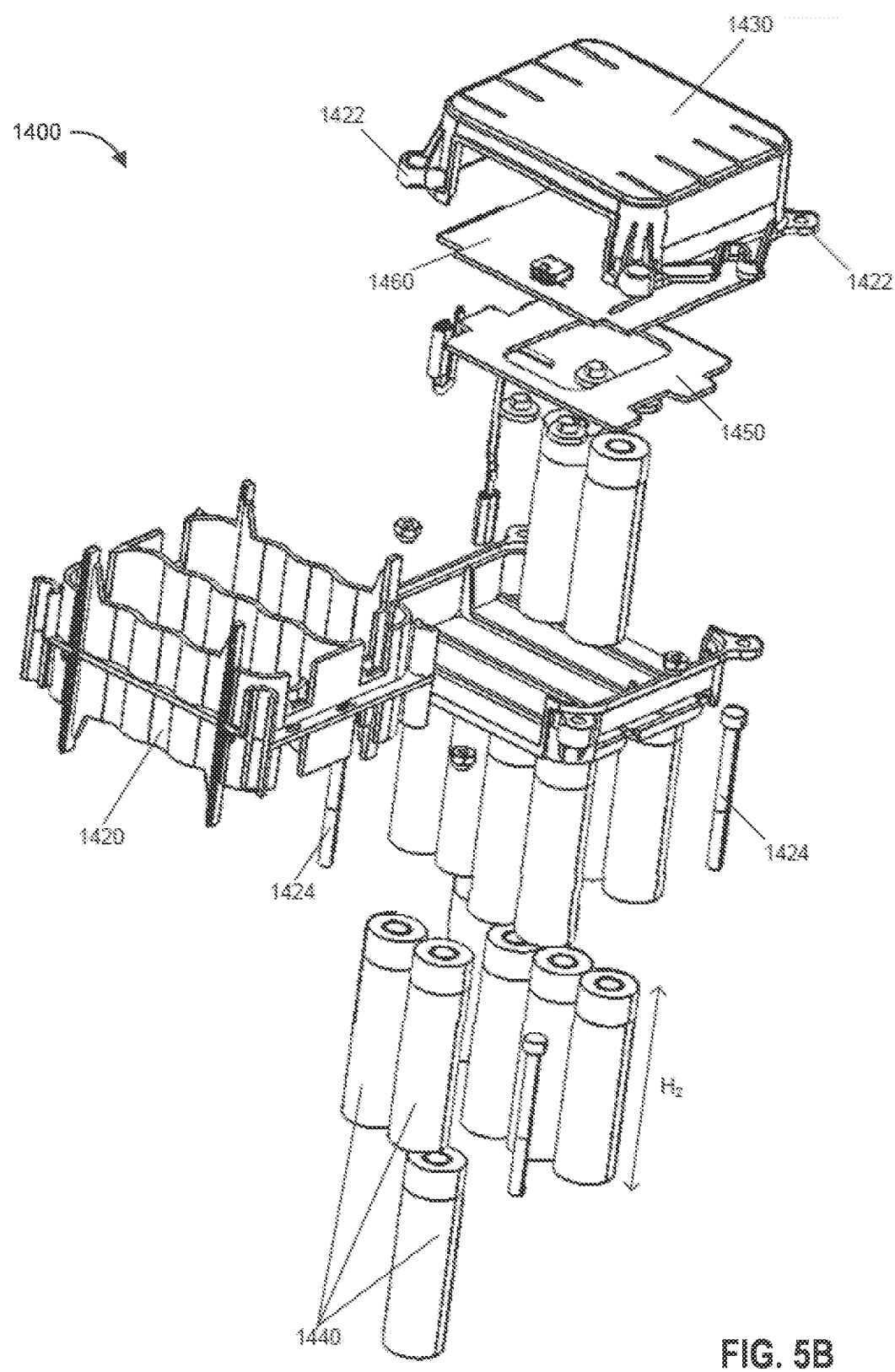

FIG. 5B illustrates an exploded view of the battery module 1400 of FIG. 5A. In the exploded view, a plate 1450 and a circuit board assembly 1460 of the battery module 1400 is shown. The plate 1450 can be copper and may electrically connect the multiple battery cells 1440 in parallel with one another. The plate 1450 may also distribute heat evenly across the multiple battery cells 1440 so that the multiple battery cells 1440 age at the same rate. The circuit board assembly 1460 may transfer power from or to the multiple battery cells 1440, as well as include one or more sensors for monitoring a voltage or a temperature of one or more battery cells of the multiple battery cells 1440. The circuit board assembly 1460 may or may not provide galvanic isolation to the battery module 1400 with respect to any components that may be electrically connected to the battery module 1400. Each of the multiple battery cells 1440 can have a height of H2, such as 30 mm, 50 mm, 65 mm, 80 mm, 100 mm, 120 mm, 150 mm or within a range defined by two of the foregoing values or another value greater or less than the foregoing values.

Figure 6A:
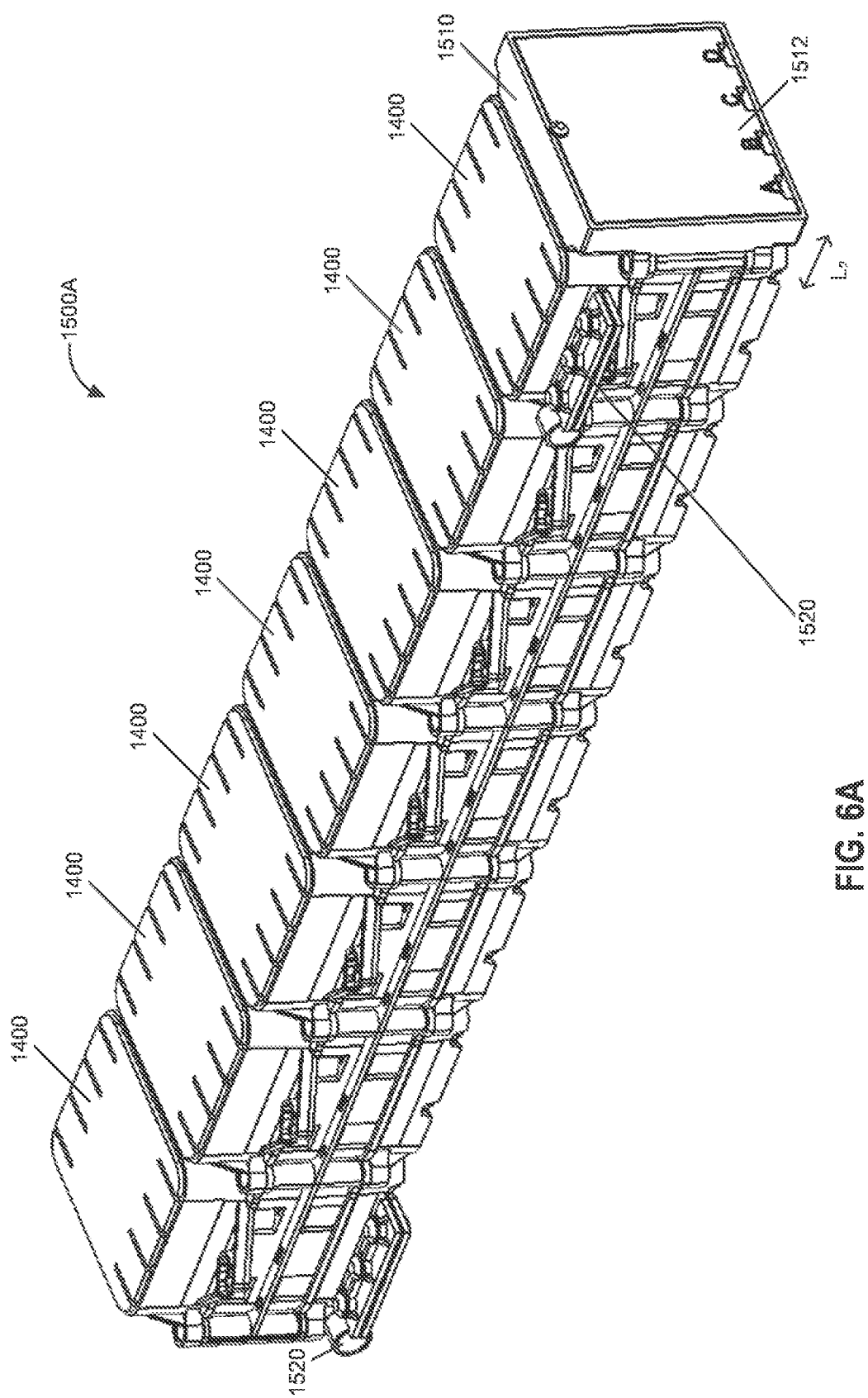
FIGS. 6A and 6B illustrate a power source formed of multiple battery modules.
Figure 14:
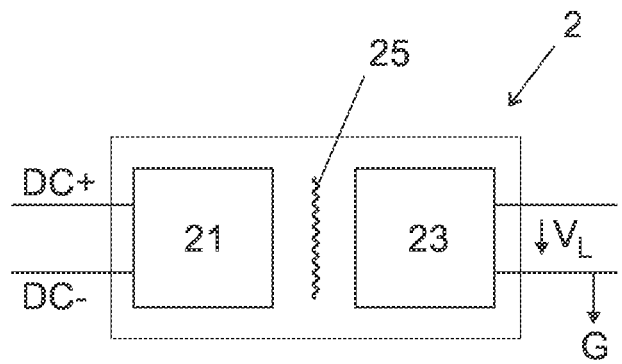
FIG. 14 illustrates an internal structure of a power converter with its electrical isolation.

FIG. 6A illustrate a power source 1500A formed of multiple battery modules 1400 of FIG. 14. The multiple battery modules 1400 of the power source 1500A can be mechanically coupled to one another. A first side of one battery module 1400 can be mechanically coupled to a first side of another battery module 1400, and a second side of the one battery module 1400 that is opposite the first side can be mechanically coupled to a first side of yet another battery module 1400. The multiple battery modules 1400 of the power source 1500A can be electrically connected in series with one another. As illustrated in FIG. 6A, the power source 1500A can include seven of the battery modules 1400 connected to one another. The power source 1500A may, for example, have a maximum power output between 1 KW and 60 KW during operation, a maximum voltage output between 10 V and 120 V during operation, or a maximum current output between 100 A and 500 A during operation.

The power source 1500A can include a power source housing 1510 mechanically coupled to at least one of the battery modules. The power source housing 1510 can include an end cover 1512 that covers a side of the power source housing 1510. The power source housing 1510 can have a length of L2, such as 3 mm, 5 mm, 10 mm, 15 mm, 20 mm, 25 mm, 30 mm, 40 mm, 50 mm or within a range defined by two of the foregoing values or another value greater or less than the foregoing values. The width and the height of the power source housing 1510 can match the length of L1 and the width of W of the battery module 1400.

The power source 1500A can include power source connectors 1520. The power source connectors 1520 can be used to electrically connect the power source 1500A to another power source, such as another of the power source 1500A.

Figure 6B:
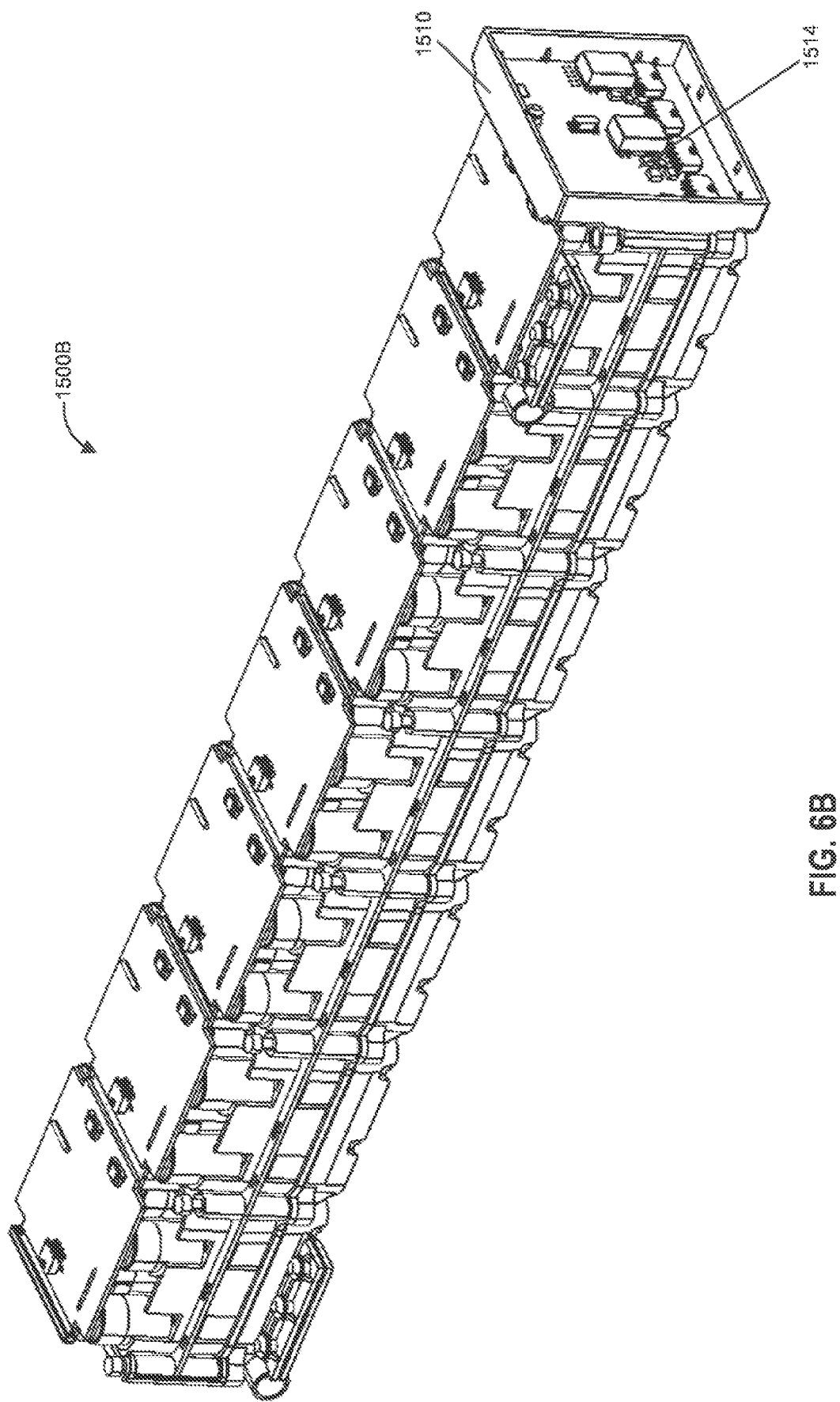

FIG. 6B illustrates a power source 1500B that is similar to the power source 1500A of FIG. 6A but with the end cover 1512 and the upper battery module housings 1430 of the battery modules 1400 removed. Because the end cover 1512 has been removed, a circuit board assembly 1514 of the power source 1500B is now exposed. The circuit board assembly 1514 can be electrically coupled to the battery modules 1400. The circuit board assembly 1514 can additionally provide galvanic isolation (for instance, 2500 Vrms) for the power source 1500B with respect to any components that may be electrically connected to the power source 1500B. The inclusion of galvanic isolation in this manner may, for instance, enable grouping of the battery modules 1400 together so that isolation may be provided to the grouping of the battery modules 1400 rather than individual modules of the battery modules 1400 or a subset of the battery modules 1400. Such an approach may reduce the costs of construction because isolation can be expensive, and a single isolation may be used for multiple of the battery modules 1400.

Figure 7:
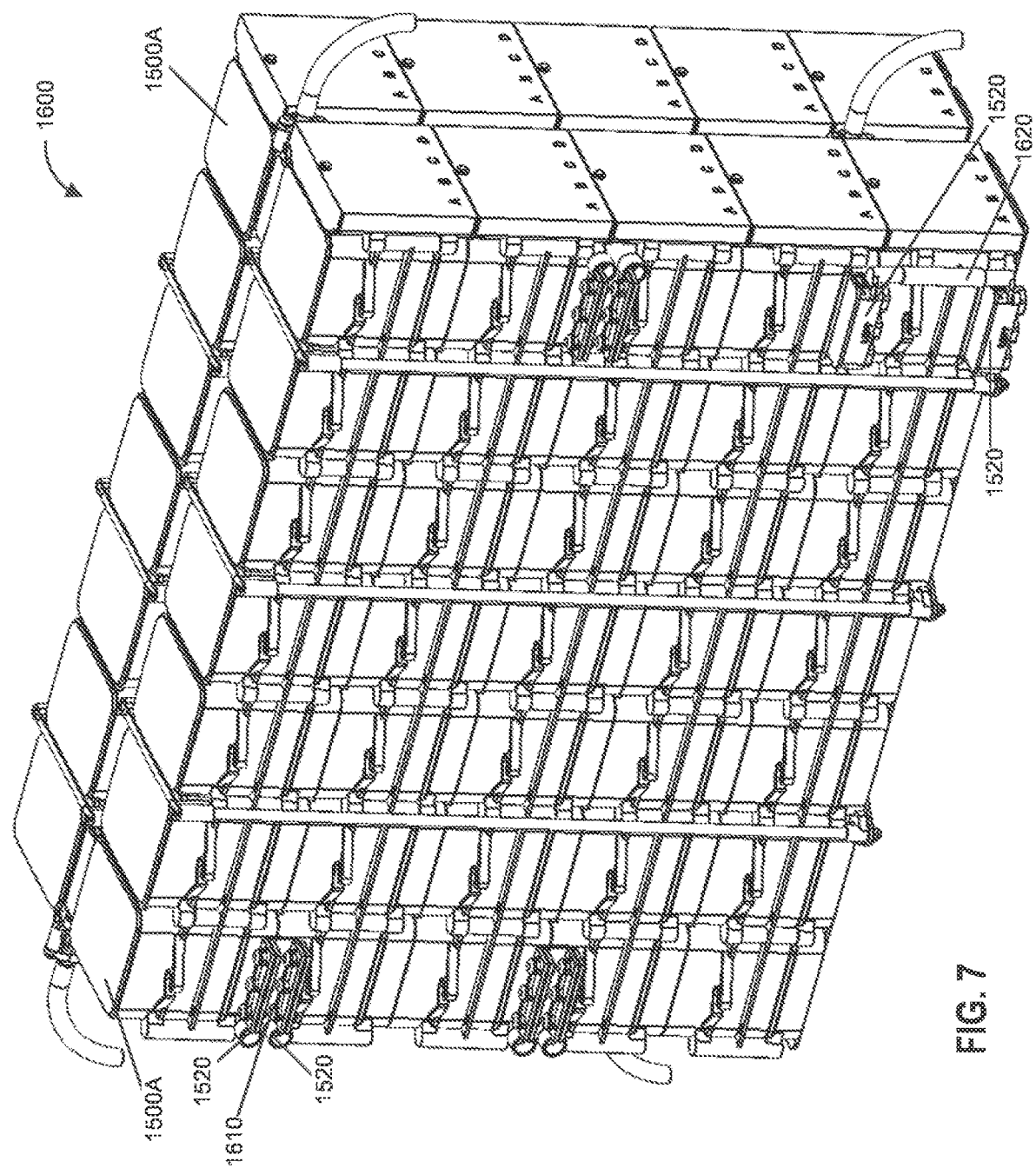
FIG. 7 illustrates multiple power sources arranged and connected for powering an aircraft.

FIG. 7 illustrates a group 1600 of multiple power sources 1500A of FIG. 6A arranged and connected for powering an aircraft, such as the aircraft 100 of FIGS. 1A and 1B. The multiple power sources 1500A of the group 1600 can be mechanically coupled to or stacked on one another. The multiple power sources 1500A of the group 1600 can be electrically connected in series or parallel with one another, such as by a first connector 1610 or a second connector 1620 that electrically connects the power source connectors 1520 of two of the multiple power sources 1500A. As illustrated in FIG. 7, the group 1600 can include 10 power sources (for instance, arranged in a 5 row by 2 column configuration). In other examples, a group may include a fewer or greater number of power sources, such as 2, 3, 5, 7, 8, 12, 15, 17, 20, 25, 30, 35, or 40 power sources.

The grouping of the multiple power sources 1500A to form the group 1600 or another different group may allow for flexible configurations of the multiple power sources 1500A to satisfy various space or power requirements. Moreover, the grouping of the multiple power sources 1500A to form the group 1600 or another different group may permit relatively easy or inexpensive replacement of one or more of the multiple power sources 1500A in the event of a failure or other issue.

Figure 8A:
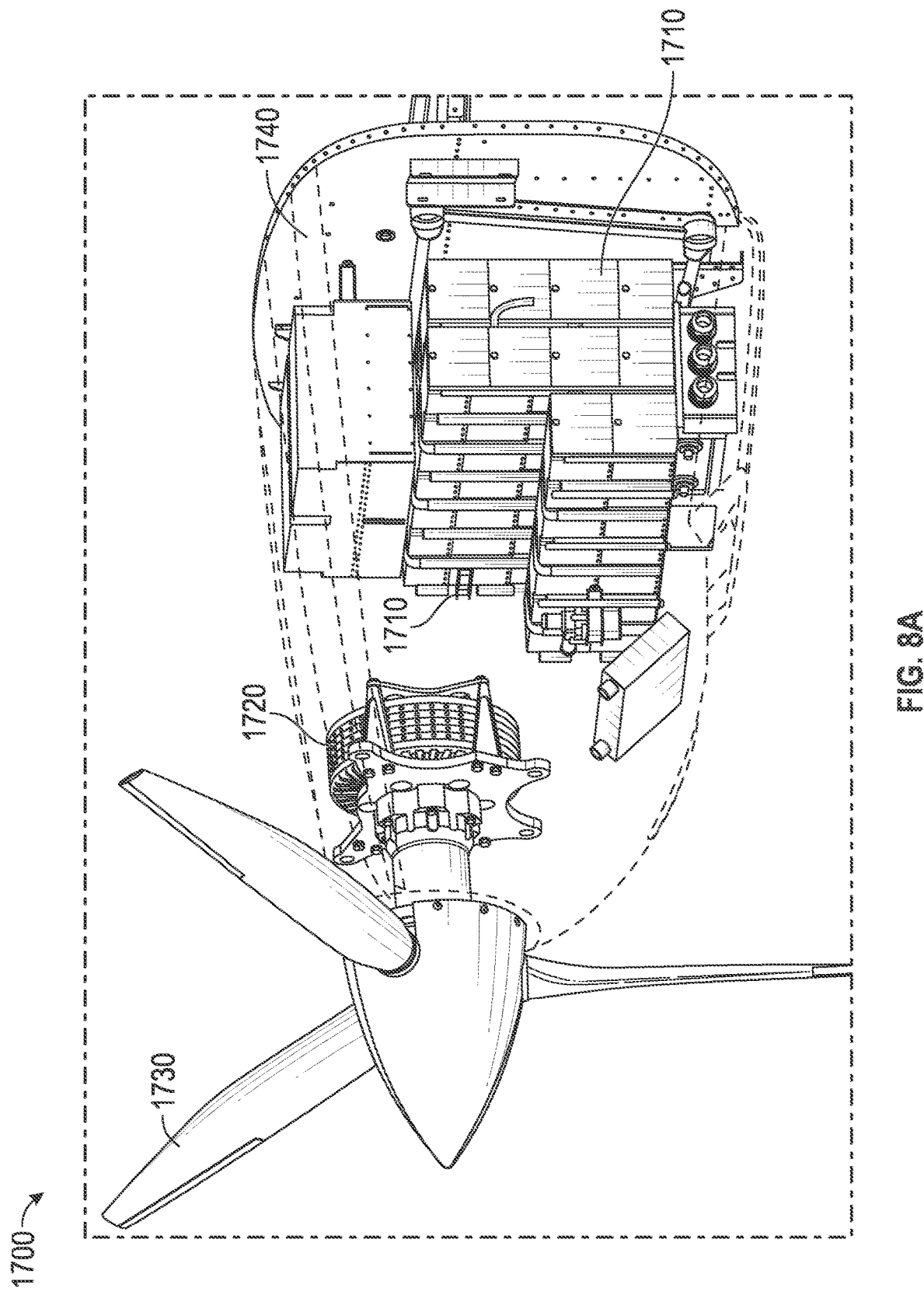
FIGS. 8A and 8B illustrate multiple power sources positioned in a nose of an aircraft for powering the aircraft.

FIG. 8A illustrates a perspective view of a nose 1700 of an aircraft, such as the aircraft 100 of FIGS. 1A and 1B, that includes multiple power sources 1710, such as multiple of the power source 1500A, for powering a motor 1720 that operates a propeller 1730 of the aircraft. The multiple power sources 1710 can be used to additionally or alternatively power other components of the aircraft. The multiple power sources 1710 can be sized and arranged to optimize a weight distribution and use of space around the nose 1700. The motor 1720 and the propeller 1730 can be attached to and supported by a frame of the aircraft by supports, which can be steel tubes, and connected by multiple fasteners, which be bolts with rubber shock absorbers. A firewall 1740 can provide barrier between the multiple power sources 1710 and the frame of the aircraft in the event of a first at the multiple power sources 1710. An enclosure composed of glass fiber, metal, or mineral composite can be around the multiple power sources 1710 to protect from water, coolant, or fire.

Figure 8B:
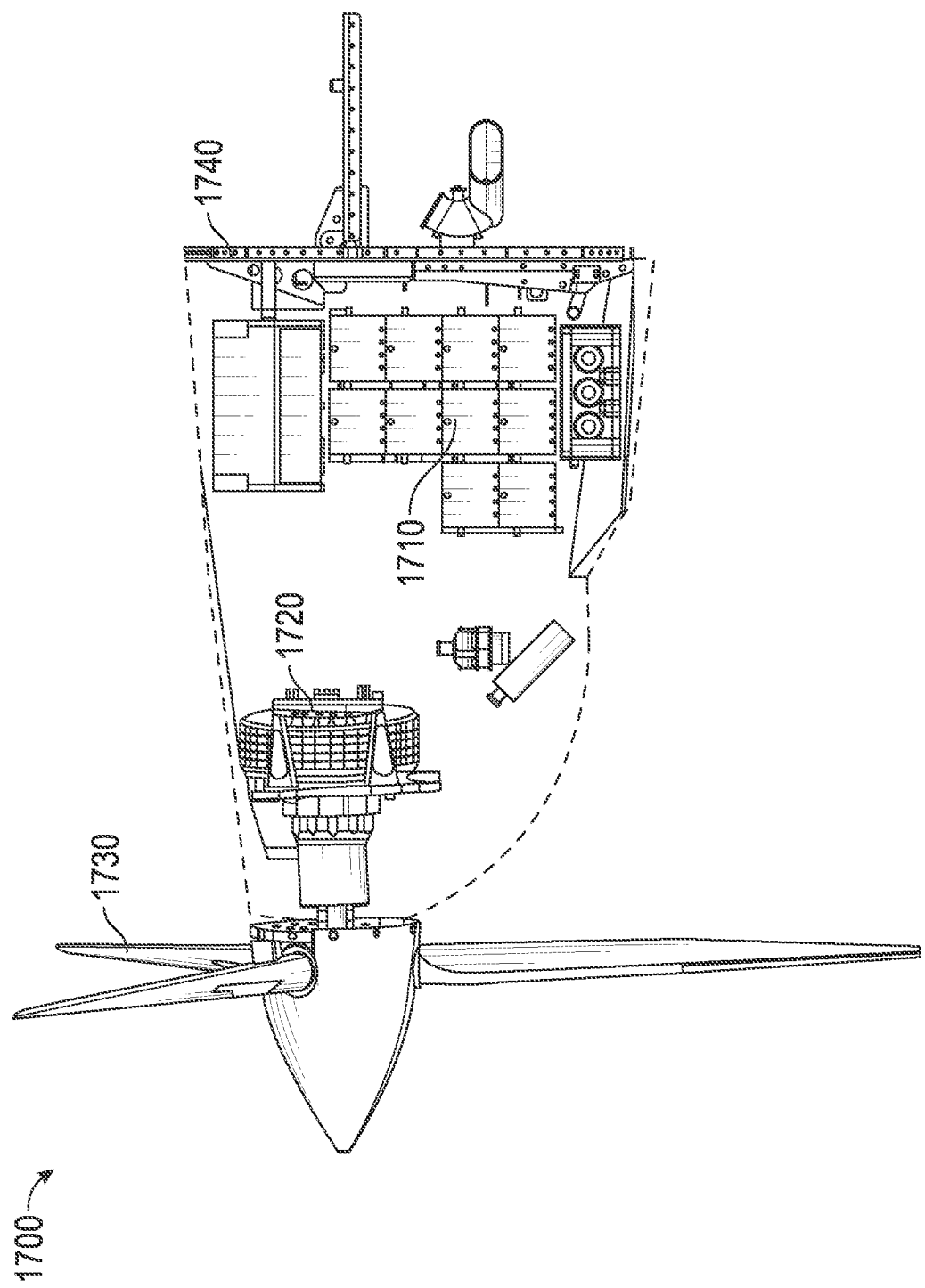

FIG. 8B illustrates a side view of the nose 1700 of FIG. 8A.

Figure 9A:
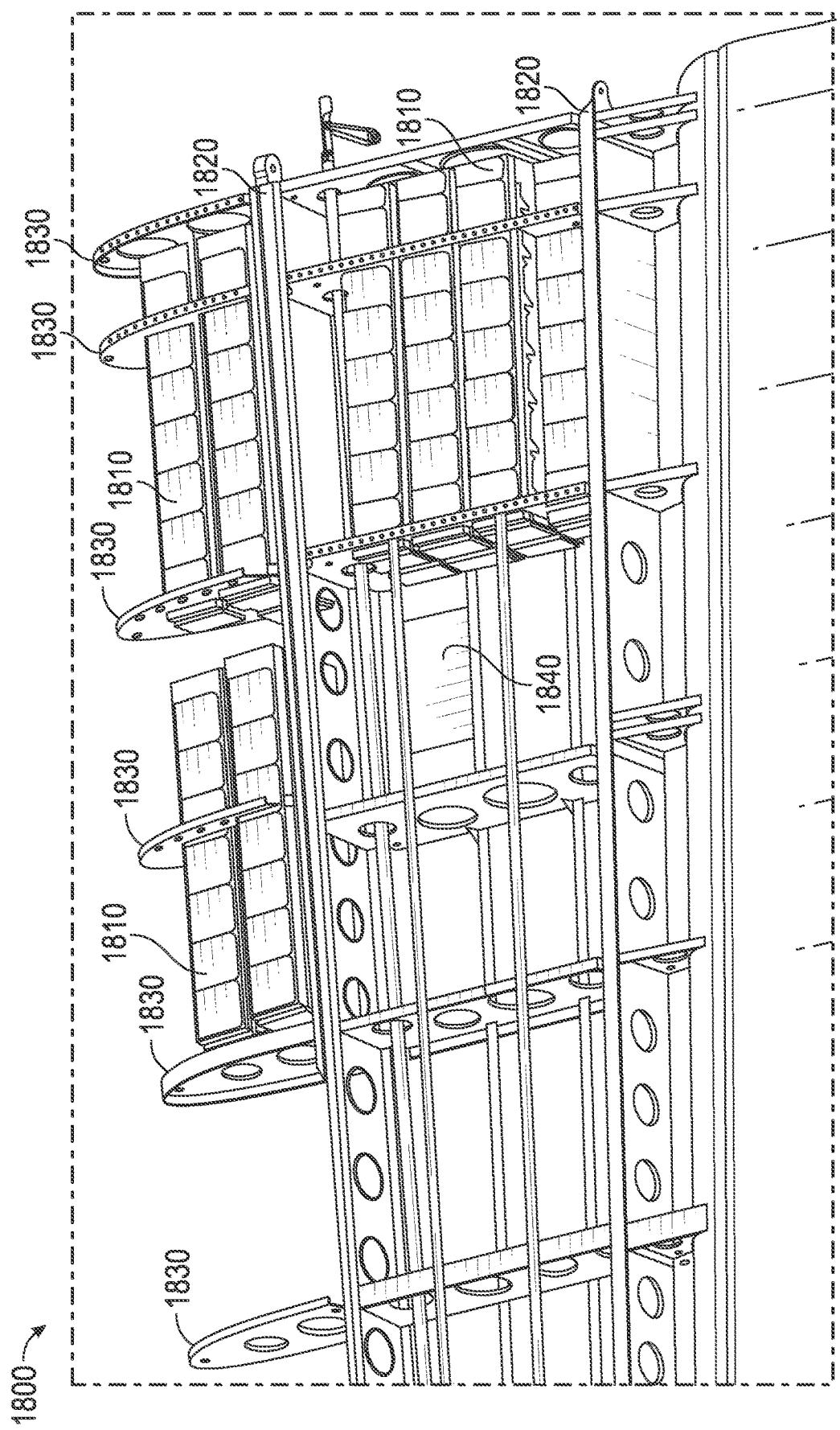
FIGS. 9A and 9B illustrate multiple power sources positioned in a wing of an aircraft for powering the aircraft.

FIG. 9A illustrates a top view of a wing 1800 of an aircraft that includes multiple power sources 1810, such as multiple of the power source 1500A, for powering one or more components of the aircraft. The multiple power sources 1810 can be sized and arranged to optimize a weight distribution and use of space around the wing 1800. For example, the multiple power sources 1810 can be positioned within, between, or around horizontal support beams 1820 or vertical support beams 1830 of the wing 1800. A relay 1840 can further be positioned in the wing 1800 as illustrated and housed in a sealed enclosure. The relay 1840 may open if there is not a threshold voltage on a breaker panel or if a pilot opens breakers to shut down the multiple power sources 1810.

Figure 9B:
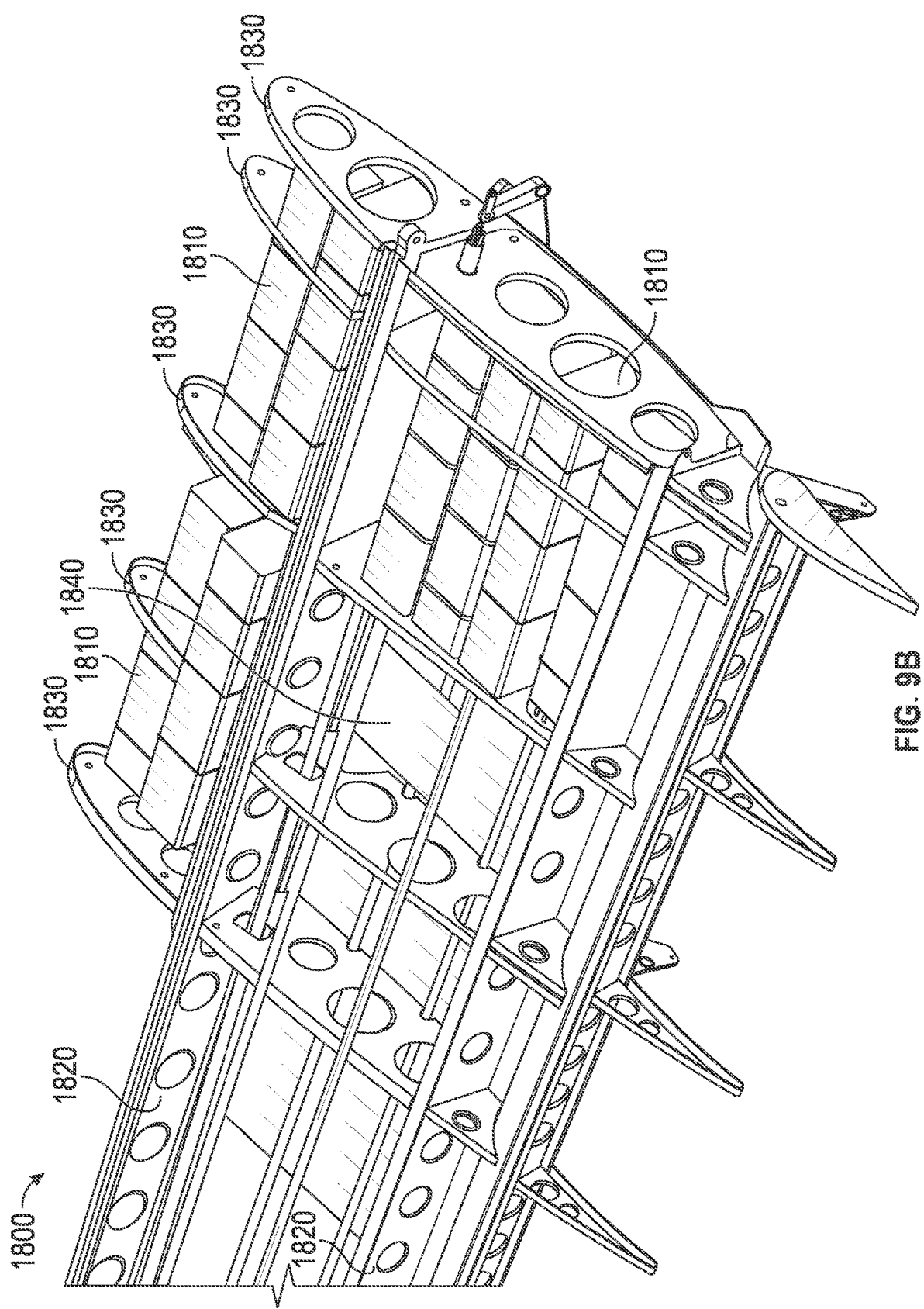

FIG. 9B illustrates a perspective view of the wing 1800 of FIG. 9A.

The battery packs in different portions of the airplanes, for example the battery packs in the wings and/or in the nose, may be connected serially and/or in parallel.

Multi-Coil Motor Control

An electric or hybrid aircraft can be powered by a multi-coil motor, such as an electric motor, in which different coils of the motor power different phases of a modulation cycle for the motor.

Figure 10:
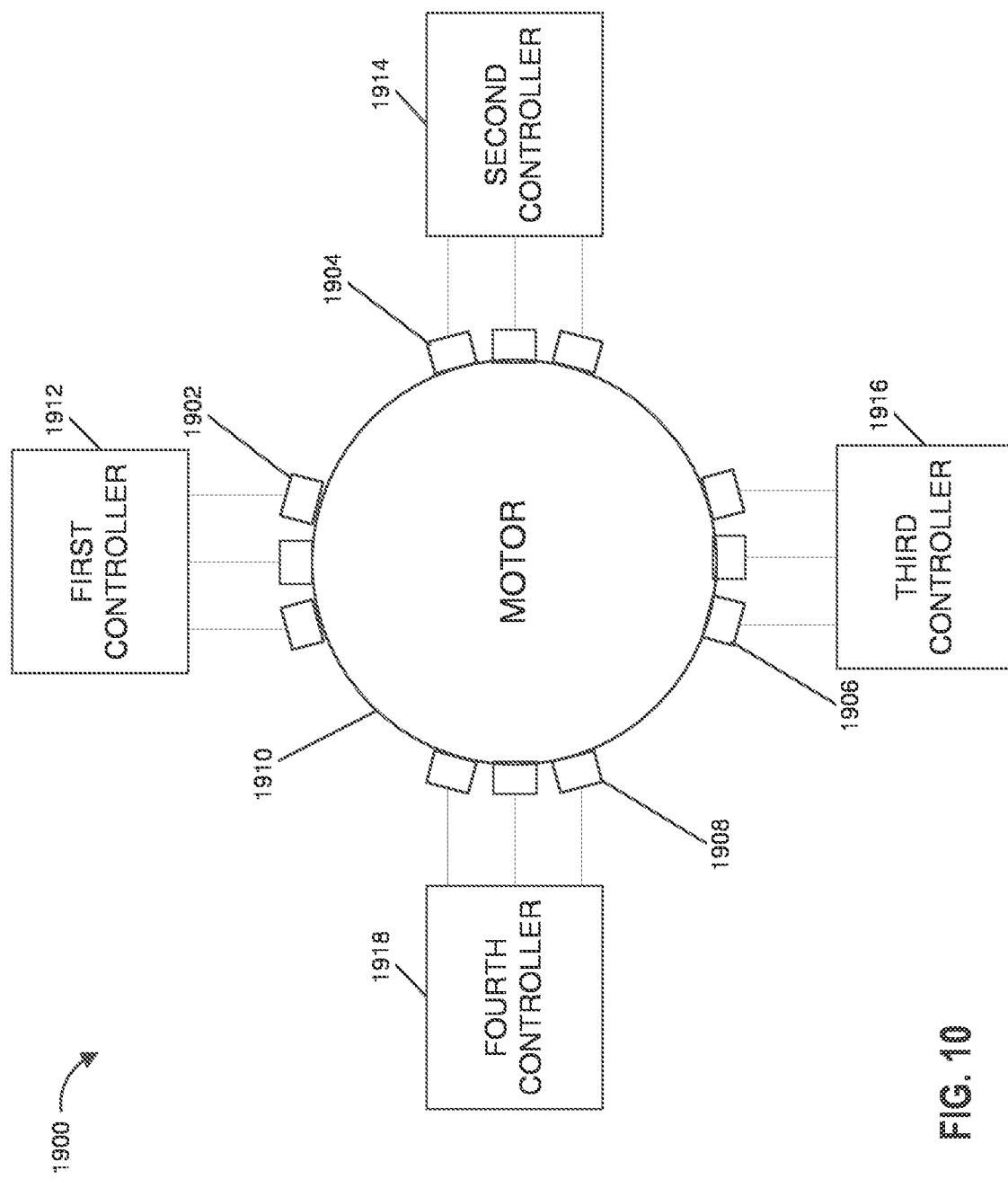
FIG. 10 illustrates a motor with multiple field coils.

As can be seen from FIG. 10, a motor 1910 can include four different field coils (sometimes also referred to as coils) for generating a torque on a rotor of the motor 1910. The different field coils can include a first field coil 1902, a second field coil 1904, a third field coil 1906, and a fourth field coil 1908. Each of the different field coils can be independently powered by one or more controllers. The first field coil 1902, the second field coil 1904, the third field coil 1906, and the fourth field coil 1908 can be respectively powered by a first controller 1912, a second controller 1914, a third controller 1916, and a fourth controller 1918. One or more of the first controller 1912, the second controller 1914, the third controller 1916, and the fourth controller 1918 may be the same controller.

Electrical Power Supply and Electrical Supply Network

Figure 11:
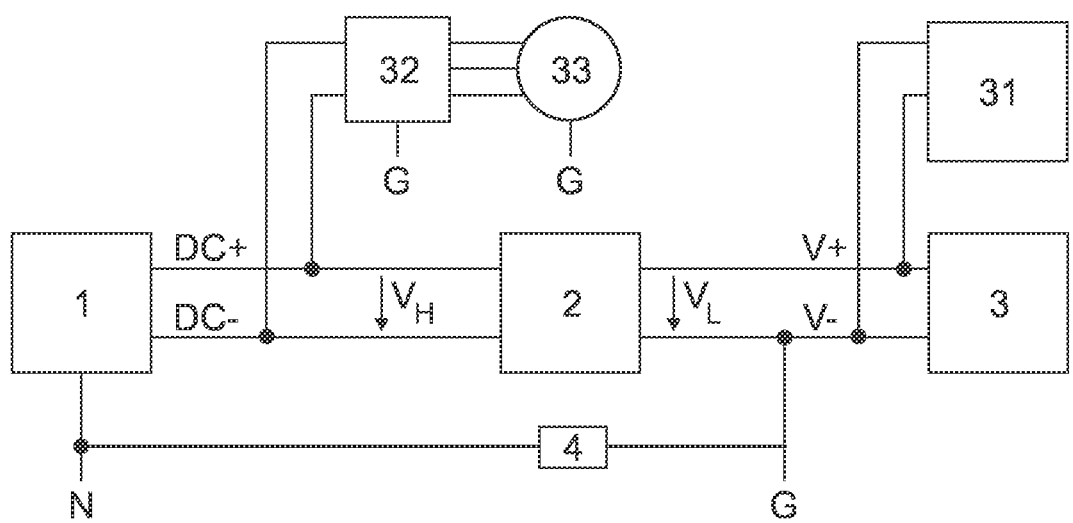
FIG. 11 illustrates a power supply system.

FIG. 11 illustrates an electrical power supply system. The power supply system comprises an electrical power source 1, a power converter 2 and a load 3. The electrical power source 1 provides a DC voltage at its output terminals DC+, DC− with a first potential difference $V_H$.

The level of the DC voltage which is provided by the electrical power source 1 may account in this embodiment to more than 800V, for example more than 1200 V, such as 1600 V. The electrical power source 1 can be connected to one or more motor controllers for powering an electrical motor of an aircraft. The one or more motor controllers can face at its input end a voltage that corresponds to the first potential difference $V_H$ provided by the electrical power source 1.

The electrical power source 1 can include a third output N that provides a potential between the potential of the first output terminal DC+ and the second output terminal DC−.

The potential of the third output N can be symmetrical with reference to the potential of the first DC+ or second DC−. In this embodiment, the first potential difference can be divided into two halves around the potential of the third output N as reference.

The voltage between the first output terminal DC+ and the third output terminal N or between the third output terminal N and the second output terminal DC− may account in this embodiment to less than 800V, for example to less than 500 V.

The power converter 2 can include input terminals and output terminals (not shown).

The power converter 2 can be connected with its input terminals to the first DC potential output DC+ and to the second DC potential output DC− of the electrical power source 1. This means that the power converter 2 may face at its input terminals the first potential difference $V_H$. In other words, the power converter 2 may face at its input terminals the full system voltage that is supplied by the electrical power source 1.

Alternatively, the power converter 2 can be connected with its input terminals to the first DC potential output DC+ and to the third DC potential output N or to the third DC potential output N and to the second DC potential output DC− of the electrical power source 1. This means that the power converter 2 may face at its input terminals one half of the first potential difference $V_H$, when the potential of the first DC potential output DC+ and the potential of the second DC potential output DC− is symmetrical with reference to the potential of the third DC potential output N.

The power converter 2 can feature in addition two output terminals, in particular a first potential output V+ and a second potential output V−.

The power converter 2 may be configured in this example as a galvanically isolated step-down DC-DC converter. The DC-DC converter can convert the DC voltage with a first potential difference $V_H$ from a high potential difference at its input terminals to a DC voltage with a second potential difference $V_L$ with a lower potential difference at its output terminals.

In one example, the voltage at the input terminals can account to a DC voltage of more than 800V, for example 1200 V and a DC voltage of 48 V or less, for example 14 V at the output terminal.

In another example, the related voltage can account to a DC voltage of more than 1200 V, for example 1600 V and a DC voltage of 120 V or less, for example 48 V at the output terminal.

In a third example, the voltage at the input terminals can account to a DC voltage of less than 800V, for example 500 V and a DC voltage of 48 V or less, for example 14 V at the output terminal, where the input terminals of the power converter 2 are connected to the first DC potential output DC+ and to the third DC potential output N of the electrical power source 1 being at 0 V.

The DC-DC converter can ensure at the same time that a galvanic isolation or at least electrical separation between the electrical circuit on the high voltage side and the load on the low voltage side is maintained. Galvanically isolated electrical systems can prevent, for example, stray currents flowing in the electrical system, causing additional losses. On the other hand, a galvanic isolation can protect people from an isolation failure in the high voltage system, when being in contact with the voltage system. Two isolation failures thus may be required to put people at risk.

The load 3 can be connected to the output terminals of the power converter 2. The load 3 may absorb the electrical energy that is supplied by the power converter 2. The load 3 can be in this embodiment avionic instruments, digital equipment, electronic equipment, cockpit low voltage battery, and/or other devices that can operate at a lower voltage. Consequently, the load 3 can be a standard electric consumer, without the ability to supply power to the output terminals of the power converter 2. The load 3 in this specific example may not be a high voltage motor controller.

As indicated before, the electrical power source 1 can include a third output terminal N. This terminal can be connected to one of the output terminals of the power converter 2 via a further impedance (not shown). In the illustrated embodiment, the DC output terminal N can be connected to the second potential output V− of the power converter 2.

In other words, the third DC output terminal N of the electrical power source 1 can be connected to the terminal of the power converter 2 to which the voltage or potential on the output end is referenced to.

The connection between the third DC potential output N and the second potential output V− can include an impedance 4. This impedance may be a resistor. The resistance of the resistor may account to more than 100 kΩ, such as 1 MΩ in this example, or more than 1 MΩ.

The third DC potential output N and the second potential output V− can be interconnected without using the impedance 4 in some embodiments. Arranging the connection without using the impedance 4 may however lead in case of faults to high currents flowing in this connection or through a human body, which might not be acceptable in the view of electrical safety.

Further devices 31, 32, 33 connectable to the electrical system of the aircraft are shown in FIG. 11, relating to a further example of this embodiment. An avionic battery 31 can be connected to the output terminals of the power converter 2. The avionic battery 31 can be charged with electrical energy supplied at the low voltage side of the power converter 2. The avionic battery 31 can also supply the load 3 in case the energy normally supplied by the power converter 2 may not be available. The avionic battery 31 can provide a DC voltage.

A motor controller 32 can be connected with its input terminals to the first DC potential output DC+ and the second DC potential output DC− of the electrical power source 1. The motor controller 32 can convert a DC voltage from an input end into a three-phase AC voltage with variable frequency and amplitude at an output end to supply a motor 33 for propelling the aircraft.

The motor controller 32 and the motor 33 can include an enclosure or a housing made of an electrically conductive material. The enclosure or housing can be connected to the electrical ground G of the aircraft using a direct connection in the form of a cable connection or a connection including an impedance, such as the impedance 4 as illustrated in FIG. 11.

This is advantageous as the requirements for separating or insulating the high voltage parts, such as the semiconductors of the motor controller 32 or the windings of the motor 33, from the potential of the enclosure can be relaxed for the same reason as set out before. In particular, the first potential difference $V_H$ can be referenced to the second potential output V− of the power converter 2. The motor controller 32 may be supplied at its input end with a DC voltage of 1200 V or higher, such as 1600 V.

Figure 12A:
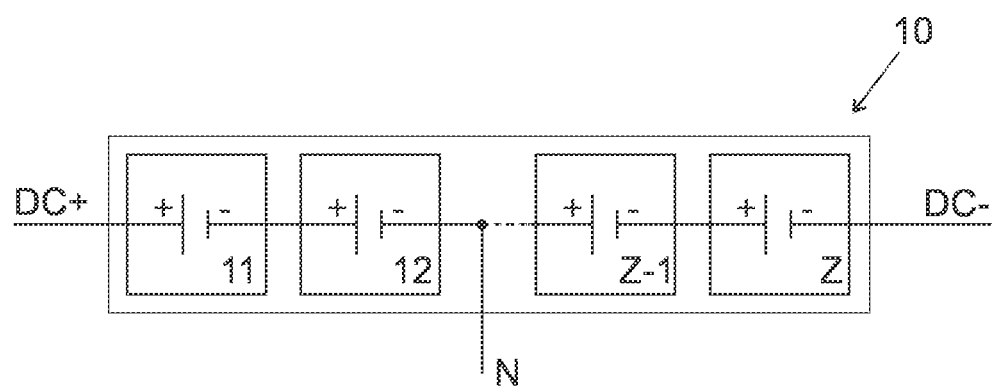
FIG. 12A illustrates a battery pack including multiple battery modules.

FIG. 12A illustrates in a further embodiment a battery pack 10 including multiple battery modules 11, 12, Z-1, Z.

The battery pack 10 can provide a DC voltage to the power converter 2. In other words, the battery pack 10 may act as an electrical power source 1 that supplies the power converter 2 with electrical energy.

The DC voltage may be above 450 V, 500 V, 550 V, 650 V. The DC voltage output of the battery pack 10 may be more than 1200 V, for example, 1600 V.

The DC voltage can be the output between a first DC potential output DC+ and a second DC potential output DC− of the battery pack 10. The potential difference between the first DC potential output DC+ and a second DC potential output DC− may provide the DC voltage output from the battery pack 10.

The first DC potential output DC+ may provide a first polarity like plus or positive and the second DC potential output DC− may provide a second polarity being different from the first polarity like minus or negative, or vice versa. The DC potential output at the first DC potential output DC+ and the DC potential output at the second DC potential output DC− may have the same absolute value (with different polarities).

The battery pack 10 can include a plurality of battery modules 11, 12, Z-1, Z which are connected in parallel or in series in order to obtain the characteristics of the battery pack 10 regarding to voltage, current, power or capacity.

The battery modules 11, 12, Z-1, Z can include lithium-based battery cells, e.g. lithium-ion battery cells or lithium-ion polymer batteries. Some of the battery cells may be based on other technologies, e.g. on supercapacitors or others.

According to one embodiment, the battery pack 10 can include a third DC potential output N.

The third DC potential output N can be at a potential between DC− and DC+, at a potential of 0 V (zero Volt). The third DC potential output N can be at a potential corresponding to the lower one of the potentials of the first and second DC potential output DC− plus the half of the potential difference between the first DC potential output DC+ and second DC potential DC−.

The battery pack 10 can include a first battery module 11, a second battery module 12, a second last battery module Z-1 and a last battery module Z as shown in the FIG. 12A.

The series connection of the first battery module 11 and the second battery module 12 may provide a first DC sub-voltage between the first DC potential output DC+ and the third DC potential output N. The series connection of the second last battery module Z-1 and the last battery module Z can provide a second DC sub-voltage between the second DC potential output DC− and the third DC potential output N.

The first and second battery modules 11, 12 and the second last battery module Z-1 and the last battery module Z can be connected in series between the first DC potential output DC+ and the second DC potential output DC− to provide the DC voltage consisting of the sum of the first DC sub-voltage and the second DC sub-voltage.

The first and second battery module 11, 12 and the second last and the last battery module Z-1, Z each may have a first output terminal and a second output terminal.

The first output terminal of the first battery module 11 can be connected with the first DC potential output DC+ and the second output terminal of the second battery module 12 can be connected with the third DC potential output N.

The first output terminal of the second last battery module Z-1 can be connected with the third DC potential output N or the second output terminal of the second battery module 12 and the second output terminal of the last battery module Z can be connected with the second DC potential output DC−.

The battery modules 11, 12, Z-1, Z can be arranged in a common housing, or in two distinct housings. The connections between the battery modules 11, 12, Z-1, Z can be an internal connection within a common housing of the battery pack 10.

Figure 12B:
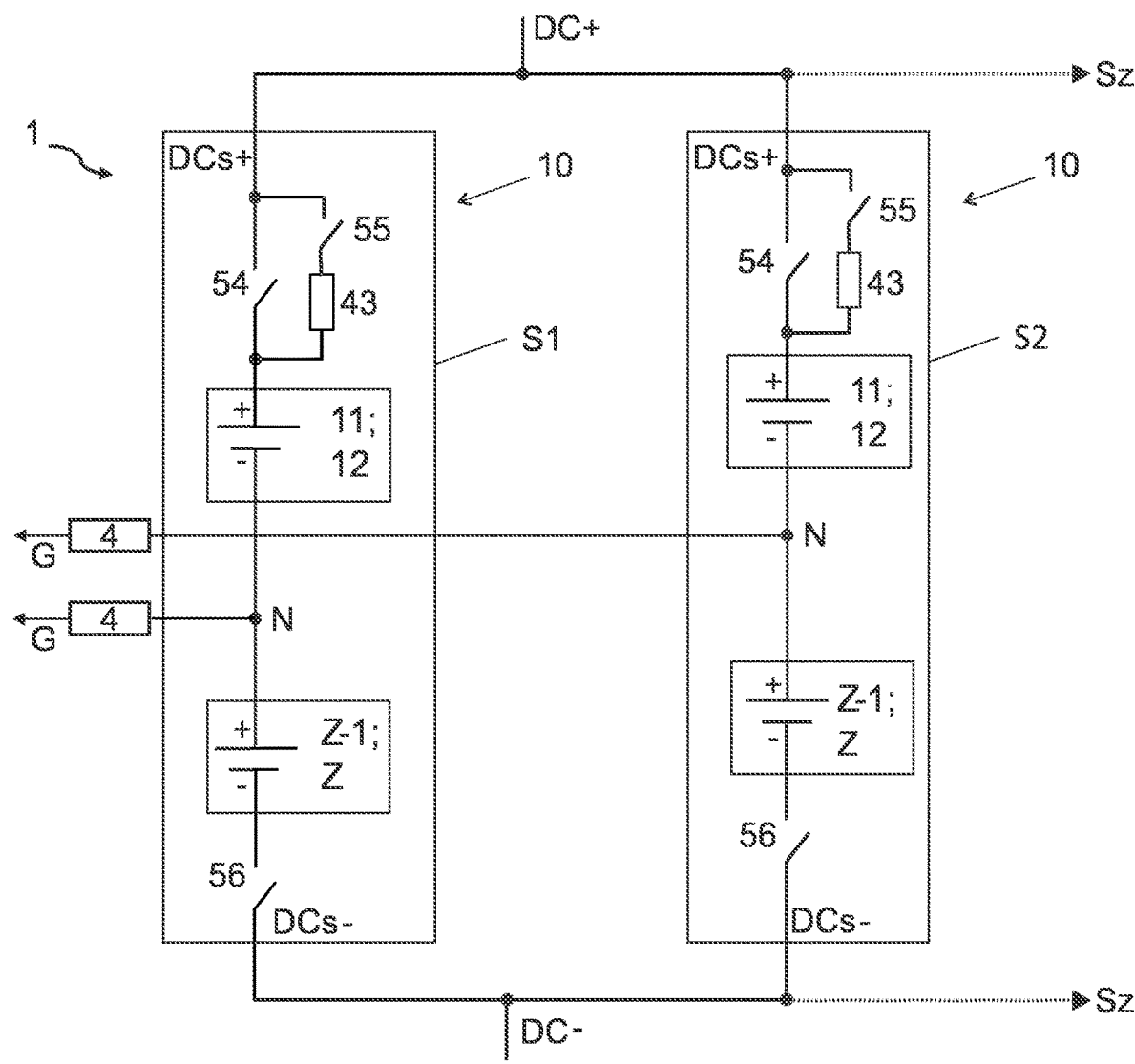
FIG. 12B illustrates battery strings including multiple battery packs.

FIG. 12B illustrates in a further embodiment of multiple battery strings S1, S2, Sz for providing the electrical power source 1. Each of the battery strings S1, S2 can include a battery pack 10, including multiple battery modules 11, 12, Z-1, Z as illustrated in FIG. 12A or 12B.

Each battery string S1, S2 can have two terminals for providing a first and a second sub-DC potential output DCs+, DCs−. The first sub-DC potential outputs DCs+ of the battery strings S1, S2 may be connected to a positive busbar for providing the first DC potential output DC+. The second sub-DC potential outputs DCs− may be connected to a negative busbar for providing the second DC potential output DC−. The battery strings S1, S2 can be connected in parallel through their terminals (sub-DC potential outputs DCs+, DCs−) to provide higher current capabilities.

It can be noticed in the corresponding figure that each battery pack 10 can be configured with a series connection of battery modules 11-Z for providing a high DC voltage output.

Each battery pack 10 of each battery string S1, S2 can provide a DC voltage measured between the first and the second sub-DC potential output DCs+, DCs− of more than 450 V, such as more than 500 V, 550 V, or 650 V.

The DC voltage output of each battery pack 10 can be more than 1200 V, such as 1600 V.

The voltage between the first and the second sub-DC potential output DCs+, DCs− can correspond to the voltage between the first and second DC potential output DC+, DC−.

Further battery strings Sz can be connected in parallel to the two battery strings S1, S2 illustrated. The additional battery strings Sz may be similarly configured as the battery strings S1, S2.

The first and the second DC potential outputs DC+, DC− may supply the power converter 2 with electrical energy, as illustrated in FIG. 11.

The battery pack 10 of each of the strings S1, S2 can include additional electrical components and circuitry. A first switch 54, such as a high power contactor, can connect a positive terminal of the battery module 11; 12 to the first sub-DC potential output DCs+. A parallel connected precharge circuit, including a second switch 55, such as a relay, and a series connected resistor 43 can limit the inrush current before the first switch 54 is closed to electrically connect the positive terminal to the first sub-DC potential output DCs+.

Alternatively or in addition, the pre-charge circuit 43, 55 can be connected in parallel to a third switch 56, such as a high power contactor, providing similar or the same switching functionality as the first switch 54.

The resistor 43 can have a low to medium ohmic value, such as between 100Ω and 10 kΩ. The resistance of the resistor 43 can be more than an order of magnitude lower than the resistance of the impedance 4.

The third switch 56 can connect a negative terminal of the battery module 11; 12 to the second sub-DC potential output DCs−. For pre-charging, the second and the third switches 55, 56 can be closed synchronously. For disconnecting the string S1, S2, the first and the third switches 54, 56 can be opened simultaneously.

Figure 16:
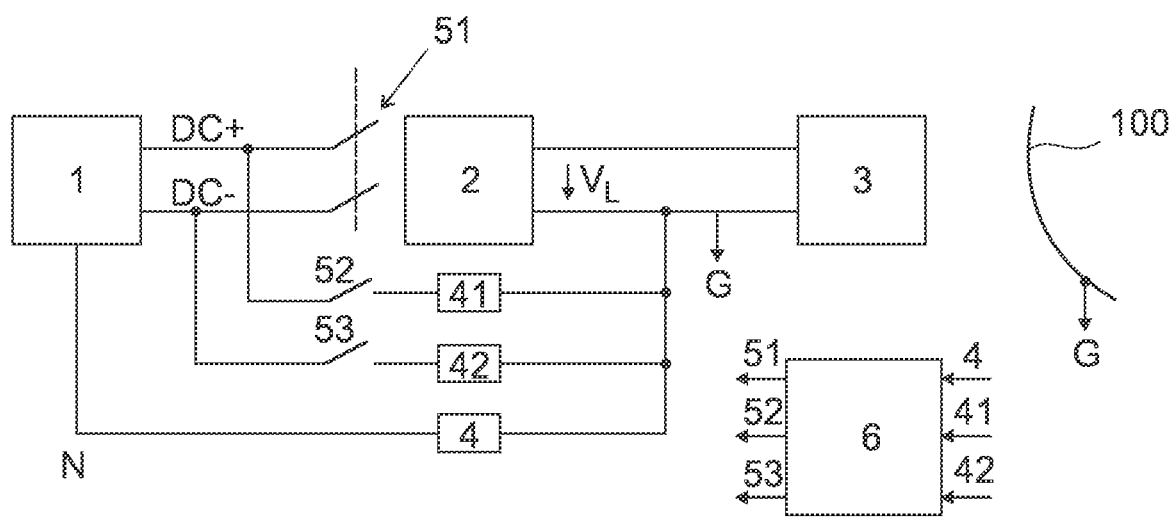
FIG. 16 illustrates an electrical supply network.

The switches 54-56 can be connected to and controlled by a controller. The controller can be configured as illustrated in FIG. 16 and described in more detail in the present disclosure. Alternatively, the switches 54-56 can be connected to and controlled by a higher level controller of the aircraft 100.

Figure 13:
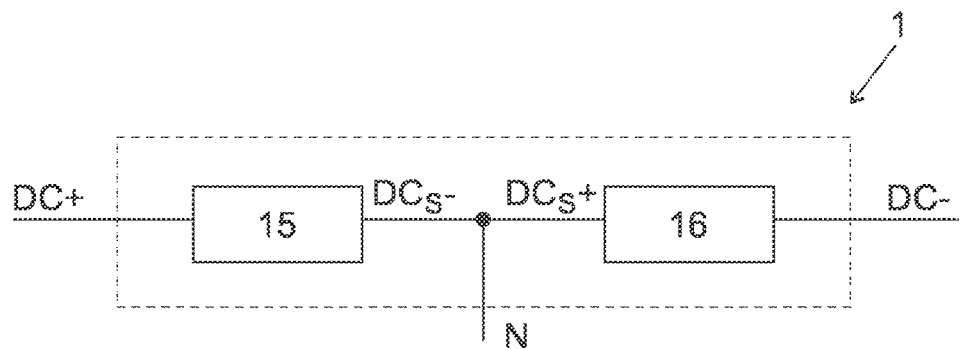
FIG. 13 illustrates a series connection of two battery packs.

The battery pack 10 of FIG. 12A or the battery packs 15, 16 of FIG. 13 can also be configured with the switches and the pre-charging circuit, as set out hereinbefore.

Each battery pack 10 of one string S1, S2 can be arranged with a terminal to provide a third DC potential output N. The third DC potential output terminal can be connected through an impedance 4 to the electrical ground G of the aircraft 100. One or more or all of the battery string S1, S2 can have with an impedance 4.

Each impedance 4 can be or include a resistor with a rating, for example, of 1 MΩ or higher.

FIG. 13 illustrates a series connection of two battery packs 15, 16. Each of the battery packs 15, 16 can be arranged for example as disclosed in the embodiments of FIGS. 12A and 12B.

The battery packs 15, 16 are arranged and can provide an intermediate DC voltage between a first DC potential output DC+ and a second DC potential output DC− for supplying the power converter 2 with electrical energy. In other words, the battery packs 15, 16 can be arranged to form a power source, such as the electrical power source 1 that supplies the power converter 2 with electrical energy.

The DC voltage between said DC potential outputs DC+, DC− can be above 450 V, 500 V, 550 V, or 650 V. The DC voltage can account to more than 1200 V, such as 1600 V.

The two battery packs 15, 16 can be connected in series. Each of the two battery packs may be provided with two terminals (not shown). The first terminal can be at a first positive potential, whereas the second terminal can be at a negative potential with reference to the potential of the first terminal.

The first terminal of the second battery pack 16 may provide a first sub-DC potential output DCs+, whereas the second terminal of the first battery pack 15 may provide a second sub-DC potential output DCs−. The two sub-DC potential outputs DCs+, DCs− can be interconnected to provide a third DC potential output N at the interconnection.

The first terminal of the first battery pack 15 may provide the first DC potential output DC+ and the second terminal of the second battery pack 16 may provide the second DC potential output DC−. The power converter 2 can be connected to the said DC potential outputs DC+, DC−.

The two battery packs 15, 16 can be arranged in one common housing.

Alternatively, a first battery pack 15 can be arranged or placed in one location of the aircraft 100, whereas a second battery pack 16 can be placed in another location of the aircraft 100. The first location can be a wing portion of the first wing, whereas a second location can be a wing portion of the second wing of the aircraft 100. Both battery packs may also be located in the same wing.

In this embodiment, the first sub-DC potential output DCs+ can be connected to the second sub-DC potential output DCs−, using a cable that is laid through the aircraft 100, as the two battery packs 15, 16 may be physically separated from each other. This cable can be configured with a tab, so that the second potential output V− of the power converter 2 can be connected to said third DC potential out N.

FIG. 14 illustrates the internal structure of the power converter 2 with its electrical isolation.

The power converter 2 may be a DC-DC converter that can be connected with its input terminals to the first DC and second DC potential output DC+, DC− of the electrical power source 1. The electrical power source 1 can be arranged either in the form of a set of battery modules or as a set of battery packs, as explained before. The power converter 2 can be further connected at its output terminals to the load 3. It is also possible to use two converters, one connected to the second DC potential output DC− and to the third DC potential out N and the other one connected to the third DC potential out N and to the first DC potential output DC+ while the outputs terminal can be put together to form an output terminal of a second potential output V− that is connected to the third DC potential output of the electrical power source 1 via a impedance.

The power converter 2 can convert a voltage with a first potential difference $V_H$ at its input terminals into a voltage with a second potential difference $V_L$ at its output terminals. The voltage at the input terminals can be greater than the voltage at the output terminals of the power converter 2.

The output terminal, in particular, the second potential output of the power converter 2 is connected to the electrical ground G of the aircraft 100. The third DC potential output of the electrical power source can be connected to the second potential output V− or electrical ground G of the aircraft via an impedance (not shown).

The power converter 2 can include a high voltage primary side 21 and a low voltage secondary side 23. The high voltage primary side may be electrical isolated from the low voltage secondary side using an insulating barrier 25. The insulating barrier 25 can be a physical component configured to isolate the primary side from the secondary side and vice versa.

The insulating barrier 25 can be a transformer that separates the input end of the DC-DC converter from the output end. The electrical supply network may operate in a fault state, when the insulating barrier 25 may not be separating the high voltage primary side 21 from the low voltage secondary side 23.

Figure 15:
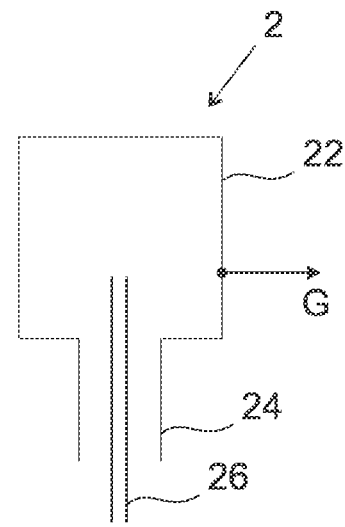
FIG. 15 illustrates a power converter along with its housing and a cable connecting the power converter to one electrical output of a battery.

FIG. 15 illustrates a power converter 2 with its enclosure 22 and a cable 26 connecting the power converter 2 to one of the DC potential DC+, DC− outputs of the electrical power source 1.

The power converter 2, which can be a DC-DC converter, can be placed in an enclosure 22. This enclosure 22 can be constructed of an electrically conductive material, such as steel or aluminium. The enclosure 22 may protect the components arranged inside the enclosure 22 against water or dust, as the enclosure 22 may feature an ingress protection. The enclosure 22 can connected to electrical ground G of the aircraft 100 and may be connected to the third DC potential output of the electrical power source 1 via an impedance (not shown).

The electrical cable 26 can connect one of the electrical outputs of the electrical power source 1 to the high voltage primary side 21 of the power converter 2. The cable 26 can enter the enclosure 22 via a feed-through 24. The electrical cable 26 may include a wire insulation (not shown) to electrical isolate the cable 26 from other potentials, such as the potential of the enclosure 22.

The enclosure 22 can be made of electrically conductive material, and the enclosure 22 may be connected to electrical ground G or to the third DC potential output N of the electrical power source 1. The insulation of the cable 26 can be configured to withstand one half of the potential difference of the first potential difference $V_H$. Same for the motor coils and the motor housing.

The cable 26 may get into contact with the electrically conductive enclosure 22, in case the insulation of the cable 26 is broken. This can lead to a fault in the electrical supply system or supply network that can be detected using the method as disclosed herein after.

FIG. 16 illustrates an electrical supply network. The electrical power supply network can include an electrical power source 1, a power converter 2 and a load 3 that is connected to the output terminals of said power converter 2. The power converter 2 is connected to the electrical power source 1. The electrical power supply network can include in addition a first connection for connecting the third DC potential output N of the power source 1 to the second potential output of the power converter 2.

The electrical power supply network furthermore can include a second and a third connection for connecting the first DC potential output DC+ and the second DC potential output DC− of the electrical power source 1 to the second potential output of the power converter 2. The second potential output of the power converter 2 can be connected to the electrical ground G of the aircraft 100.

Each of the connections may include an impedance 4, 41, 42 for limiting a current flow. Each of the impedances 4, 41, 42 can include a resistor with a rating for example of 1 MΩ or more. The second and third connection can furthermore include a switch 52, 53 configured to interrupt or establish the connection.

The power converter 2 can include a contactor 51 at its input end, configured to separate the power converter 2 from the electrical power source 1.

The electrical power supply network further can include a controller 6, for example a microcontroller. The controller 6 may have analogue inputs, configured to convert a voltage level into a digital value. The controller 6 can include analogue outputs configured to convert a digital value into voltage level.

The electrical power supply network further may include three voltage sensors (not shown) that are connected to each of the three impedances 4, 41, 42 and configured to measure a voltage across each of the said impedances 4, 41, 42. The analogue inputs of the controller 6 can be connected to the voltage sensors. Two of the analogue outputs of the controller 6 can be connected to the switches 52, 53. One further analogue output can be connected to the contactor 51.

The controller 6 can measure a voltage across the impedances 4, 41, 42 and control the contactor 51 or the switches 52, 53 between an open position (which may relate to a non-conductive state) and a closed position (which may relate to a conductive state).

The controller 6 can execute a software or perform a control method that implements the following steps, such as in the order as disclosed hereinafter.

A control method for testing the insulation integrity of the electrical power supply system or the electrical supply network can be executed by the controller 6 during preparation of the aircraft 100 for takeoff.

Alternatively or in addition, the insulation integrity can be tested by executing the method as outlined hereinafter when the aircraft 100 is cruising.

In an initial state of the electrical power supply network the power converter 2 may be connected to the electrical power source 1 as the contactor is in a closed position.

The first switch 52 and the second switch 53 can be in an open position, meaning that the connection between one of the DC potential outputs DC+, DC- of the electrical power source and the second potential output V- of the power converter 2 is interrupted. The electrical power source 1 may supply the power converter 2 with electrical energy, whereas the power converter 2 may convert the electrical energy from the high voltage primary side 21 into electrical energy on the low voltage secondary side 23.

For testing the insulation integrity of the electrical supply network, the controller 6 may determine the voltage across the first impedance 4 by measuring the voltage at the analogue input that is connected to the related voltage sensor.

Under normal operational conditions the voltage across the first impedance 4 may be zero or close to zero, as the electrical supply network on the side of the electrical power source 1 is electrically insulated from the electrical supply network on the secondary side of the power converter 2.

In a further, potentially subsequent step for testing the insulation integrity of the electrical supply network, the controller 6 may control the first switch 52 from an open position to a closed position, to arrange the connection between the first DC potential output DC+ of the electrical power source 1 and the second potential output V- of the power converter 2.

The controller 6 may determine the voltage across the first impedance 4 by capturing the voltage at the analogue input that is connected to the related voltage sensor.

The controller 6 may further determine the voltage across the second impedance 41 by capturing the voltage at the analogue input that is connected to the related voltage sensor.

The controller 6 can, in addition in a subsequent step, control the first switch 52 from a closed position to an open position to interrupt the connection between the first DC potential output DC+ of the electrical power source 1 and the second potential output V- of the power converter 2.

Under normal operational conditions, the voltage across the first impedance 4 may be equal to the voltage across the second impedance 41, as the electrical supply network on the side of the electrical power source 1 is electrically insulated from the electrical supply network on the secondary side of the power converter 2.

Furthermore, a comparison of the two voltage measurements may indicate that the electrical supply network on the side of the electrical power source 1 does not have an insulation fault.

In a further, potentially subsequent step for testing the insulation integrity of the electrical supply network, the controller 6 may control the second switch 53 from an open position to a closed position, to arrange the connection between the second DC potential output DC- of the electrical power source 1 and the second potential output V- of the power converter 2.

The controller 6 may determine the voltage across the first impedance 4 by capturing the voltage at the analogue input that is connected to the related voltage sensor.

The controller 6 may further determine the voltage across the third impedance 42 by capturing the voltage at the analogue input that is connected to the related voltage sensor.

In a subsequent step, the controller 6 can control the second switch 53 from a closed position to an open position to interrupt the connection between the second DC potential output DC- of the electrical power source 1 and the second potential output V- of the power converter 2.

Under normal operational conditions, the voltage across the first impedance 4 may be equal to the voltage across the third impedance 42, as the electrical supply network on the side of the electrical power source 1 is electrically insulated from the electrical supply network on the secondary side of the power converter 2.

Furthermore, a comparison of the two voltage measurements may indicate that the electrical supply network on the side of the electrical power source 1 does not have an insulation fault.

A comparison of the two measurements of the voltage across the second impedance 41 and the third impedance 42 may indicate that there is no insulation fault apparent when the two voltage measurements are the same values.

When the impedances are configured to have the same electrical properties, the potential of the first DC potential output DC+ can be symmetrical to the potential of the second DC potential output DC- the voltage across the two said impedances (second impedance 41 and third impedance 42) and thus be at the same level.

In case the impedances are configured with different electrical properties, such as a different resistance, the introduction of a threshold value or reference value to which the measurements are compared, the measurements may not be directly comparable to each due to deviating electrical properties.

Comparing the voltage across the three impedances 4, 41, 42 with each other provides the advantage that insulation faults between the high voltage primary side 21 and the low voltage secondary side 23 can be detected in addition to insulation faults on the side of the electrical power source 1.

In particular, insulation faults in the electrical power source 1 can be detected. Such insulation faults can be caused, for example, by damaged battery modules 11, 12, Z-1, Z placed in a housing of the electrical power source 1 or broken cable insulation.

The controller 6 can communicate with other control devices in the aircraft 100 via a communication bus or a hard wired connection.

In case one of the measurements of the voltage deviates from a measurement that is expected during normal operation, the controller 6 may alert other control devices in the aircraft, that the insulation integrity of the electrical power supply network or the electrical power source is violated.

The controller 6 may initiate further actions, such as to open the contactor 51, for disconnecting the power converter 2 from the electrical power source 1 in case said insulation integrity violation is detected.

Additional Features and Terminology

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecrafts, hovercrafts, or the like.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

Unless otherwise specified, the various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Unless otherwise specified, the various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

Unless otherwise specified, the steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

What is claimed is:

1. An electrical power supply system for a vehicle, the electrical power supply system comprising:
   a power source having a first output, a second output, and a third output, the power source being configured to supply a first voltage between the first output and the second output and a second voltage between the third output and the second output so that the power source supplies a power source output voltage between the first output and the third output; and
   a power converter electrically connected to the power source via the first output or the third output, the power converter having a fourth output and a fifth output and being configured to supply a power converter output voltage between the fourth output and the fifth output and connect to a load via the fourth output and the fifth output, the power converter output voltage being less than the power source output voltage, the fourth output or the fifth output being electrically connected to the third output via an impedance.

2. The electrical power supply system of claim 1, wherein the power source output voltage is a DC voltage.

3. The electrical power supply system of claim 1, further comprising a housing supporting the power source and the power converter, the fifth output being electrically connected to an electrical ground of the housing.

4. The electrical power supply system of claim 1, wherein the impedance is greater than 400 kΩ.

5. The electrical power supply system of claim 1, wherein the first voltage and the second voltage have a common magnitude.

6. The electrical power supply system of claim 5, wherein the first voltage and the second voltage have different polarities relative to one another.

7. The electrical power supply system of claim 5, wherein the common magnitude is greater than 800 V.

8. The electrical power supply system of claim 5, wherein the common magnitude is between 400 V and 800 V, inclusive.

9. The electrical power supply system of claim 1, wherein the power source comprises a first set of battery modules configured to provide the first voltage and a second set of battery modules configured to provide the second voltage.

10. The electrical power supply system of claim 9, wherein the first set of battery modules and the second set of battery modules are part of a common battery pack.

11. The electrical power supply system of claim 1, wherein the power source comprises a first battery pack configured to provide the first voltage and a second battery pack configured to provide the second voltage.

12. The electrical power supply system of claim 11, wherein the first battery pack is electrically connected in series with the second battery pack.

13. The electrical power supply system of claim 11, further comprising a first switch configured to electrically connect the first battery pack to the first output and a second switch configured to electrically connect the second battery pack to the second output.

14. The electrical power supply system of claim 13, further comprising a third switch and another impedance that are connected in series with one another and connected in parallel to the first switch or the second switch.

15. The electrical power supply system of claim 1, further comprising a motor controller electrically connected to the power source and configured to receive the power source output voltage.

16. The electrical power supply system of claim 15, wherein the motor controller is positioned in an electrically conductive housing that is supported by an aircraft, and the electrically conductive housing is connected to an electrical ground of the aircraft.

17. The electrical power supply system of claim 1, further comprising a controller configured to control supply of power to the power converter.

18. The electrical power supply system of claim 17, wherein the controller is configured to determine a voltage across the impedance.

19. The electrical power supply system of claim 17, further comprising a third switch configured to electrically connect the fifth output to the first output or the second output via another impedance and interrupt an electrical connection between the fifth output and the first output or the second output.

20. The electrical power supply system of claim 19, wherein the controller is configured to control the third switch between a non-conducting and a conducting state.

21. The electrical power supply system of claim 19, further comprising a fourth switch, the third switch being configured to electrically connect the fifth output to the first output via the another impedance and interrupt the electrical connection between the fifth output and the first output, the fourth switch being configured to electrically connect the fifth output to the second output via yet another impedance and interrupt an electrical connection between the fifth output and the second output.

22. The electrical power supply system of claim 21, wherein the controller is configured to control the third switch and the fourth switch and determine a voltage across the impedance, the another impedance, and the yet another impedance.

23. The electrical power supply system of claim 22, wherein the controller is configured to compare the impedance to the another impedance or the yet another impedance.

24. The electrical power supply system of claim 23, wherein the controller is configured to generate an alert responsive to a comparison of the impedance to the another impedance or the yet another impedance.

25. The electrical power supply system of claim 22, wherein the another impedance and the yet another impedance each have a resistance greater than 400 kΩ.

26. The electrical power supply system of claim 22, wherein the power source and the power converter are part of an aircraft that is configured to fly.

27. The electrical power supply system of claim 22, wherein a first cable is configured to electrically connect the fifth output to the first output, and a second cable is configured to electrically connect the fifth output to the second output, the first cable and the second cable each having an electrical insulation that is configured to withstand the first voltage during operation of the power source and the power converter.

28. The electrical power supply system of claim 1, wherein the power converter comprises a DC-DC converter.

29. The electrical power supply system of claim 1, wherein the power source is an electrical power source.

30. The electrical power supply system of claim 1, wherein the power source is electrically connected to the power source via the first output and the third output and configured to receive the power source output voltage.

* * * * *